(12) United States Patent
McKinley

(10) Patent No.: US 7,210,257 B2
(45) Date of Patent: May 1, 2007

(54) DEVICE FOR DISPLAYING LENTICULAR DISPLAYS

(76) Inventor: William R. McKinley, 69 Park La., Golf, IL (US) 60029

( * ) Notice: Subject to any disclaimer, the term of this patent is extended or adjusted under 35 U.S.C. 154(b) by 0 days.

(21) Appl. No.: 10/620,867

(22) Filed: Jul. 16, 2003

(65) Prior Publication Data

US 2004/0139635 A1 Jul. 22, 2004

Related U.S. Application Data

(63) Continuation-in-part of application No. 10/021,872, filed on Dec. 7, 2001, now Pat. No. 6,624,947, which is a continuation-in-part of application No. 09/800,969, filed on Mar. 6, 2001, now Pat. No. 6,384,980.

(51) Int. Cl.
*G09F 19/14* (2006.01)

(52) U.S. Cl. .......................... 40/453; 40/454

(58) Field of Classification Search ................ 40/453, 40/454, 466, 467, 740; 352/100; 430/946
See application file for complete search history.

(56) References Cited

U.S. PATENT DOCUMENTS

| | | | |
|---|---|---|---|
| 3,841,010 A * | 10/1974 | Ludwig | 40/437 |
| 5,695,346 A * | 12/1997 | Sekiguchi et al. | 434/365 |
| 6,055,753 A * | 5/2000 | Sondericker, III | 40/471 |
| 6,178,674 B1 * | 1/2001 | Decaux et al. | 40/471 |
| 6,219,948 B1 * | 4/2001 | Bar-Yona | 40/454 |
| 6,226,906 B1 * | 5/2001 | Bar-Yona | 40/454 |
| 6,748,684 B1 * | 6/2004 | Bar-Yona | 40/454 |
| 6,843,009 B2 * | 1/2005 | Kainen | 40/454 |
| 2004/0020088 A1 * | 2/2004 | Dana et al. | 40/453 |

* cited by examiner

*Primary Examiner*—Gary C. Hoge
(74) *Attorney, Agent, or Firm*—John W. Hayes

(57) ABSTRACT

The claimed invention provides a self-actuating lenticular display assembly that places the lenticular image in intimate contact with the lenticular lens while maintaining the lenticular image separate from the lenticular lens to form the lenticular display. The lenticular display assembly further comprises a rigid back plate placed behind the lenticular display so that the lenticular image moves in a parallel plane between the lenticular lens and the rigid back plate, a motor that accomplishes movement of the lenticular image in relation to the lenticular lens, alignment mechanisms that allow the lenticular image to be incrementally adjusted in relation to the lenticular lens, and different means for maintaining intimacy between the lenticular image and the lenticular lens, thus eliminating undesirable "soft spots" that may occur. Alternative embodiments are also presented that relate to, among other features, a flexible, removably attached back plate, a "dwell" feature provided near the mid-point of image excursion, and a mechanism that permits selection of a desired image display sequence.

19 Claims, 17 Drawing Sheets

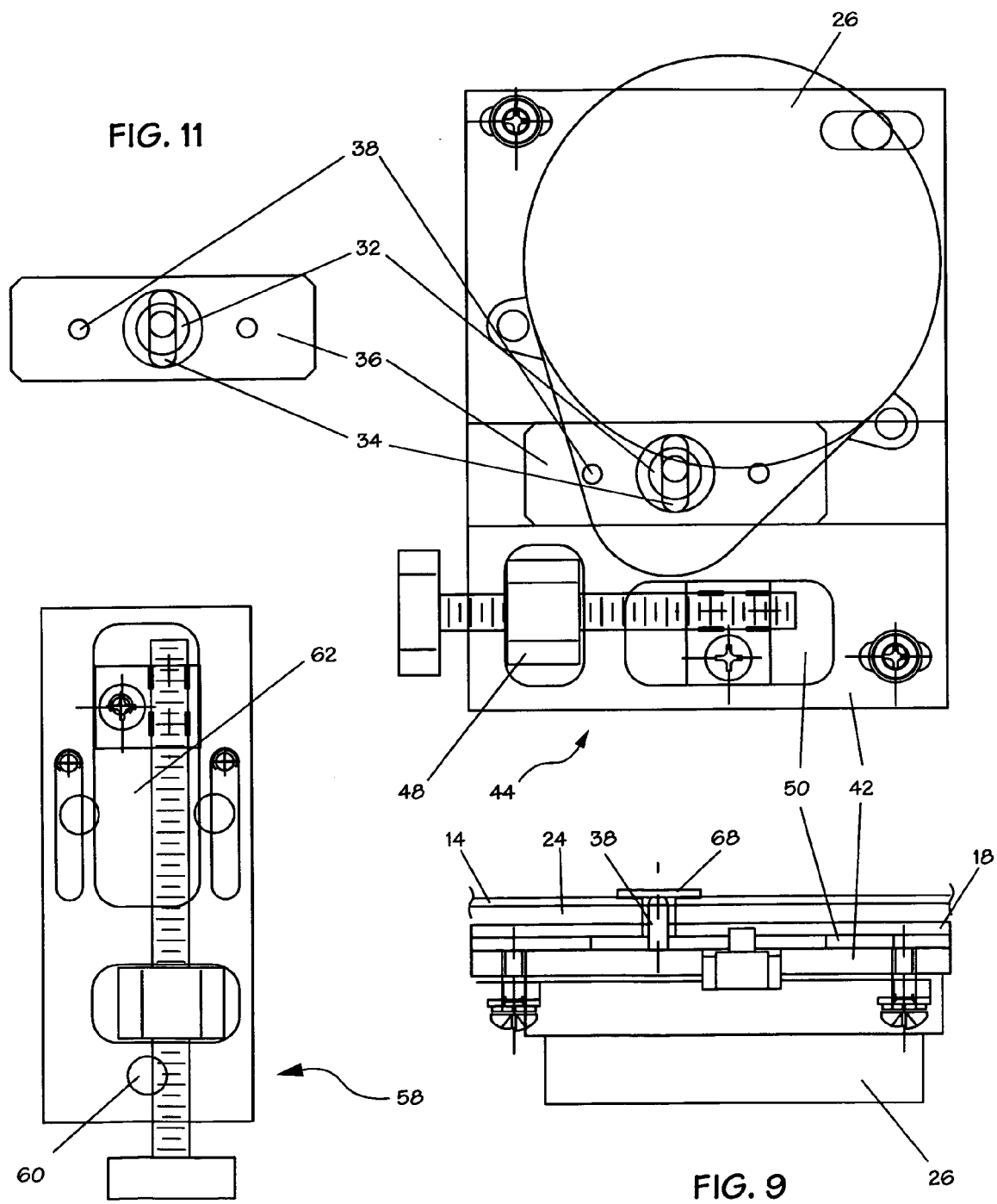

DEVICE FOR DISPLAYING LENTICULAR DISPLAYS

RELATED APPLICATIONS

This application is a Continuation in Part of U.S. patent application Ser. No. 10/021,872, filed Dec. 7, 2001 now U.S. Pat. No. 6,624,947, which is a Continuation in Part of U.S. patent application Ser. No. 09/800,969 filed Mar. 6, 2001 now U.S. Pat. No. 6,384,980.

BACKGROUND OF THE INVENTION

1. Field of the Invention

The present invention generally relates to a method and device for displaying signage systems. More specifically, the present invention relates to an improvement in displaying lenticular images.

2. Description of the Prior Art

A lenticular lens as used in this field is a sheet of transparent material having one side composed of a contiguous array of cylindrical lenses known as lenticules, and the other side being generally flat. U.S. Pat. No. 5,757,545 issued to Wu et al. discusses the structure of a lenticular lens. Lenticular images that are typically used in conjunction with the lenticular lenses are composite images composed of several different independent images interlaced into the same space. U.S. Pat. Nos. 5,364,274 and 5,494,445 issued to Sekiguchi discuss the process of making a lenticular image.

Viewing a lenticular image through a lenticular lens, collectively known as a lenticular display, is well known in the prior art. A lenticular display allows a viewer to perceive multiple images appearing individually within the same dimensional space or plane. It is also possible for a person viewing a lenticular display to perceive a three dimensional visual effect within the same plane due to the parallax shift associated with the distance between the viewer's eyes viewing a slightly different image presented by the lenticular display.

A lenticular image is typically either imprinted directly to the back side of the lenticular lens or fixedly mounted to the back side of the lens to form the lenticular display. U.S. Pat. No. 5,710,666 issued to McDonald discloses a viewer that holds a lenticular image behind a lenticular lens. Similarly, U.S. Pat. Nos. 5,850,913 and 5,941,382 issued to Fantone et al. discloses a display box utilizing a lenticular image viewed through a lenticular lens. In order to perceive the different images presented in lenticular displays of this type, the angle at which the viewer observes the lenticular display must be changed. Thus, as the viewer's angle of observation changes, the discrete images contained within the lenticular image are seen as different images or a sequence of related images as animations or morphs. To allow a stationary viewer to perceive the different images presented in a lenticular display of this type, the lenticular display must be moved in order to achieve the necessary angle change. Alternatively, the movement of the viewer can be relied upon to change the angle of observance of a stationary lenticular display of this type. FIG. 1 illustrates a lenticular display of this typical prior art type where the lenticular image is fixedly attached to the lenticular lens. Thus, a signage display system utilizing a typical lenticular display for advertising or other such purposes, must therefor be moved if one desires to display the different lenticular images to a stationary viewer.

U.S. Pat. No. 4,118,879 issued to Simons discloses an animated display device having illuminating means in which shutter film and program film are continuously maintained in complete contact. To accomplish this, a rigid platen having a convex surface that carries the shutter film is mounted within a housing disposed in facing contact with the convex surface of the platen. Tensioning springs are used to hold the shutter film against the convex platen. Drive means are provided for moving the program film relative to the platen so as to alter the alignment of the shutter film and program film to change the image projected by the device. This display device is of rather complex structure consisting of many expensive parts, is rather cumbersome to install, and is not adaptable for use with existing standard signage display systems and light box displays.

Therefore, there exists a need for an effective self-actuating lenticular display assembly that can be used with existing and standard signage display systems and light box displays. It is the primary object of this invention to fill this need.

Another objective of the claimed invention is to provide a self-actuating lenticular display that is less expensive and complex to manufacture.

Another objective of the claimed invention is to provide a self-actuating lenticular display that is relatively light and has a thin profile.

Another objective of the claimed invention is to provide a self-actuating lenticular display that provides means to reduce "soft spots" which may occur during operation of a self-actuating lenticular display.

SUMMARY OF THE INVENTION

The claimed invention is directed to providing a solution to the problem of complex lenticular display devices that are expensive to manufacture and are not adaptable to existing standard signage display systems and light box displays, as well as other problems associated with the effective presentation of lenticular displays.

The claimed invention provides a self-actuating lenticular display assembly that places the lenticular image in intimate contact with the lenticular lens while maintaining the lenticular image separate from the lenticular lens to form the lenticular display. Since the lenticular image is separate from that of the lenticular lens, the position of either the lenticular image or the lenticular lens can be moved while the other can remain stationary. The lenticular display assembly utilizes the independent nature of the lenticular image by moving a smaller lenticular image in a parallel plane to that of the lenticular lens while allowing an existing standard signage display system to hold the lenticular lens in a stationary position. This independent relationship forms an effective lenticular display capable of displaying the different images of a lenticular image that can be used in an existing stationary signage display system or display light box. With the lenticular lens remaining stationary, and the lenticular image moving in a parallel plane behind the lenticular lens inside the signage display system or display light box, the lenticular display appears to remain stationary to the viewer while the displayed images change.

The lenticular display assembly further comprises a rigid back plate placed behind the lenticular display so that the lenticular image moves in a parallel plane between the lenticular lens and the rigid back plate. Ordinarily, the rigid back plate is smaller than the lenticular lens so that the outer profile of the lenticular display assembly has a thickness equal to the thickness of the lenticular lens. However, the rigid back plate may also be larger than the lens if the particular application so dictates. Consequently, whenever the back plate and lens happen to be of different sizes, the outermost profile may be reduced to the thickness of whichever plate is largest.

The rigid back plate is preferably made of a transparent material when the lenticular display assembly is constructed to be used in a light box display that provides light from behind the lenticular display assembly. The rigid back plate can however be made of many other types of non-transparent material if the lenticular display assembly is anticipated to be used in a setting that will not use back lighting, such as hanging the lenticular display assembly directly on a wall.

The resulting structure of the claimed self-actuating lenticular display assembly provides an assembly with a lightweight as well as slim profile that can be used in existing standard signage display systems with little or no modification.

To accomplish the movement of the lenticular image in relation to the lenticular lens, a motor located in proximate relation to the top or bottom center of the lenticular image is used. The motorized movement of the lenticular image behind the lenticular lens provides the self-actuating effect of the lenticular display assembly.

One critical aspect of displaying lenticular images is the physical alignment of the linear axis of the lens (or lenticules) with the linear axis of the lenticular images. Alignment and positioning between the lenticular image and lenticular lens must be maintained for a viewer to observe the multiple images as the lenticular image moves in a direction perpendicular to the linear axis of lenticular lens. The claimed invention maintains this critical relationship by employing alignment mechanisms that allow the lenticular image to be incrementally adjusted in relation to the lenticular lens.

Another important aspect pertaining to employing a lenticular image separate from the lenticular lens is maintaining the "intimacy of the relationship" between the lenticular image and the lenticular lens. If the lenticular image is not maintained in an intimate relationship with the lenticular lens, "soft spots" occur in the displayed image. A "soft spot" describes the blurred lenticular display or portion of the lenticular display that is produced when the intimacy of the relationship is not maintained and the image resides outside of the focal length of the lens. The "soft spot" is an undesirable condition that detracts from the presentation of an effective lenticular display. The claimed invention claims different means for maintaining intimacy between the lenticular image and the lenticular lens, thus eliminating undesirable "soft spots" that may occur.

One embodiment of the claimed invention, as shown in FIG. 2, is directed to a signage display system utilizing the claimed lenticular display assembly with the means for maintaining the intimacy of the relationship comprising a sealed bladder that is formed by attaching a flexible material such as thin plastic sheeting to the rigid back plate. The sealed bladder is inflated with air by way of a hose connected to a motorized pump mounted to the back side of the back plate that pushes the lenticular image toward the lenticular lens. As the sealed bladder inflates, it pushes against the back side of the lenticular image. Due to the lenticular image being printed on a pliable medium such as plastic film, the sealed bladder pushes the lenticular image toward the lenticular lens as the rigid back plate resists deflection. The internal pressure of the sealed bladder can then be increased or decreased to control the intimacy of relationship between the lenticular image and the lenticular lens. A preferred technique for pressure control is the use of a pressure control valve such as a Johnson Controls Model Number P32 AF-2, having an adjustable pressure threshold from 0.05 to 5 inches of water. A small cooling fan, similar to the type used to ventilate a personal computer housing, may be mounted over an opening in the back plate as a substitute for the motorized pump that inflates the bladder.

Another embodiment of the claimed invention shown in FIG. 4 is directed to a signage display system utilizing the claimed lenticular display assembly with the means for maintaining the intimacy of the relationship comprising a sealed chamber between the lenticular lens and the rigid back plate. A motorized pump by way of a hose evacuates the sealed chamber to form a vacuum within the sealed chamber. The vacuum pulls the lenticular lens and lenticular image toward the rigid back plate. As the sealed chamber is evacuated, the lenticular lens and the lenticular image are drawn together to attain the desired intimacy between the lenticular image and the lenticular lens. The evacuation rate can be altered to vary the intimacy of the relationship between the lenticular lens and the lenticular image.

Yet another embodiment of the claimed invention shown in FIG. 3 is directed to a signage display system that utilizes the claimed lenticular display assembly with the means for maintaining the intimacy of the relationship utilizing the sealed chamber concept to deflect the lenticular lens toward the lenticular image. This embodiment forms a sealed chamber between the lenticular lens and a rigid protective glass or cover that protects the lenticular lens. The sealed chamber is pressurized with air by way of a hose connected to a motorized pump mounted to the back side of the rigid back plate. As the sealed chamber pressurizes, the lenticular lens deflects toward the lenticular image to attain the desired intimacy between the lenticular image and the lenticular lens.

As discussed above, one embodiment of the present invention contemplates a self-contained display system utilizing a lenticular lens and graphic in which a motor displaces the graphic to bring the appropriate portions of the artwork into alignment with the lens segments. In order to minimize the "soft spot" phenomenon that plagues known displays of this type, one of the illustrative embodiments utilizes a pressurized bladder to ensure the requisite degree of intimacy of contact between the display surface of the graphic and the lens through which the images are viewed.

Although the bladder system represented an innovation in this type of display, construction of a properly operating system based upon this technology has proven to be a bit touchy as well as a bit expensive. Since the thin, inflatable bladder requires an internal pressure only slightly greater than ambient to function properly, a pressure regulating system of the necessary sensitivity and accuracy is an expensive item that is difficult of construction and installation. It may also add a measure of fragility to the overall system that is considered something of a drawback, considering the field environment in which these display systems are regularly used.

To overcome this difficulty, an alternative embodiment is described in which a transparent conductive coating is applied to either or both the lenticular lens and the graphic sheet, and an electrical charge is then applied. The electrical charge attracts the graphic sheet to the lens relatively firmly and uniformly, eliminating the need for the bladder or other alternatives for achieving intimacy of contact as described above. Of course, the charge cannot be too great, or the graphic sheet will adhere so firmly that the standard drive motor may no longer be capable of moving it smoothly.

It is also worth noting that the lenticular lens described hereinabove serves the purpose of resolving a particular image (among a set of images that have been applied to the graphic image plate) for the benefit of an observer at a distance. Other means for resolving an image, other than a lenticular lens, have also proven to be advantageous. Chief among these is the so-called "barrier strip" or "shutter film" comprising an alternating series of parallel, laterally extending regions of an opaque and transparent nature. A barrier strip may be substituted for the lenticular lens plates recited in the specification.

In accordance with yet another aspect of the present invention, an improved self-actuating display assembly, adapted for insertion onto an existing visual display system, includes a light-transmissive back plate that is removably attached to the means for resolving image information. An easily removable and re-attachable back plate makes it much easier for a user to update the image information for the display system. In a further improvement, the means for maintaining intimacy of contact between the means for storing image information and the means for resolving image information comprises a flexible envelope having exterior dimensions approximating the exterior dimensions of the means for storing image information. A fan disposed proximate an opening in the envelope provides sufficient static pressure, absent a unique pressure-regulating device, to maintain the envelope in an inflated condition.

A further enhancement of the self-actuating display device includes the introduction of a time delay near the central portion of image excursion. This delay momentarily stops the drive motor and prevents the center portion of the image plate from going by too quickly. This delay feature allows the viewer a good look at the center image, then starts up the drive motor once again. In yet another operational enhancement, the integrally constructed drive motor and adjustment mechanism includes an eccentric cam mechanism that permits the image information storage means to be aligned at a desired initial position.

Other advantages and aspects of the present invention will become apparent upon reading the following detailed description of the invention.

BRIEF DESCRIPTION OF THE DRAWINGS

FIG. 8—Illustrates a side view of a preferred embodiment of the first alignment means integrated with the moving means.

FIG. 9—Illustrates a top view of a preferred embodiment of the first alignment means integrated with the moving means.

FIG. 10—Illustrates a side view of a preferred embodiment of the second alignment means.

FIG. 11—Illustrates the slider, off-center cam, and drive pin.

DETAILED DESCRIPTION OF THE INVENTION

Figure 1:
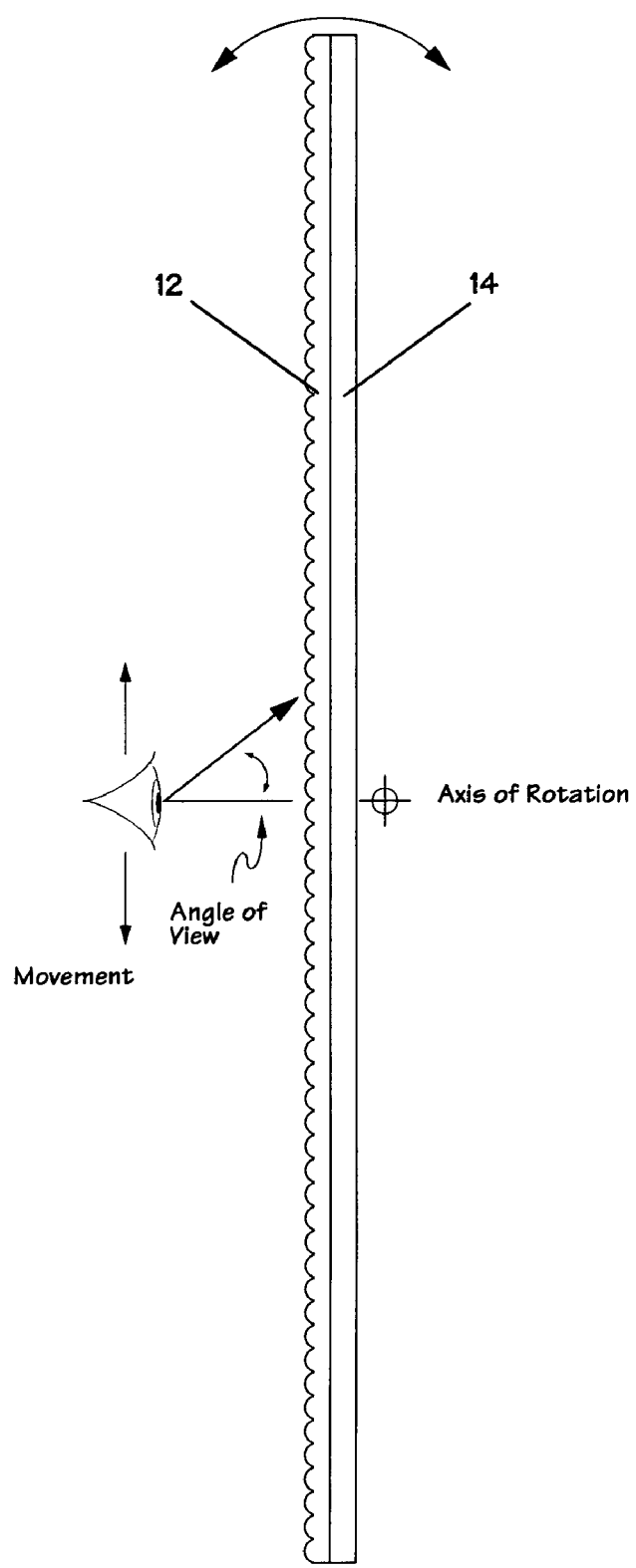
FIG. 1—Illustrates a prior art lenticular display with a lenticular image fixedly mounted to a lenticular lens.

While this invention is susceptible of embodiments in may different forms, there is shown in the drawings and will herein be described in detail several embodiments of the invention. The present disclosure is to be considered as an exemplification of the principles of the invention and is not intended to limit the broad aspect of the invention to the embodiment illustrated.

FIGS. 2 through 11 show one embodiment of the lenticular display assembly 10 that provides a self-actuating lenticular display capable of being used with existing signage display systems that typically implement graphic images having a thickness of up to 0.25 inches at the graphic image's perimeter.

Figure 2:
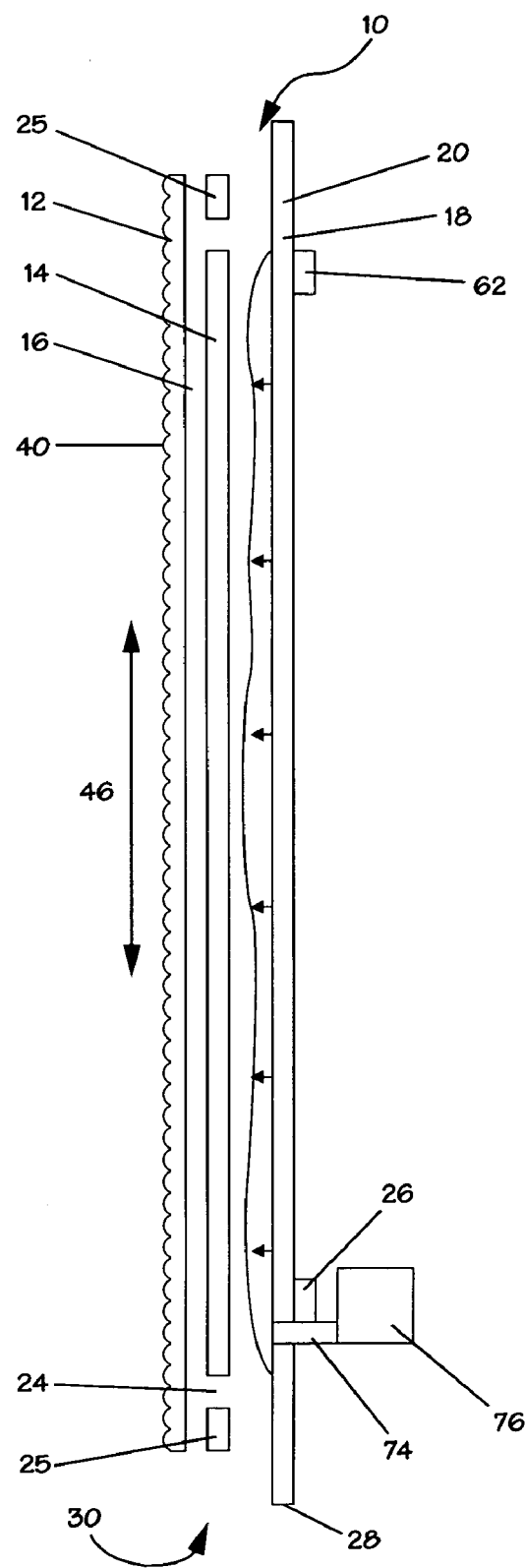
FIG. 2—Illustrates a side view of one exemplary embodiment of the lenticular display assembly with an inflated sealed bladder.
Figure 3:
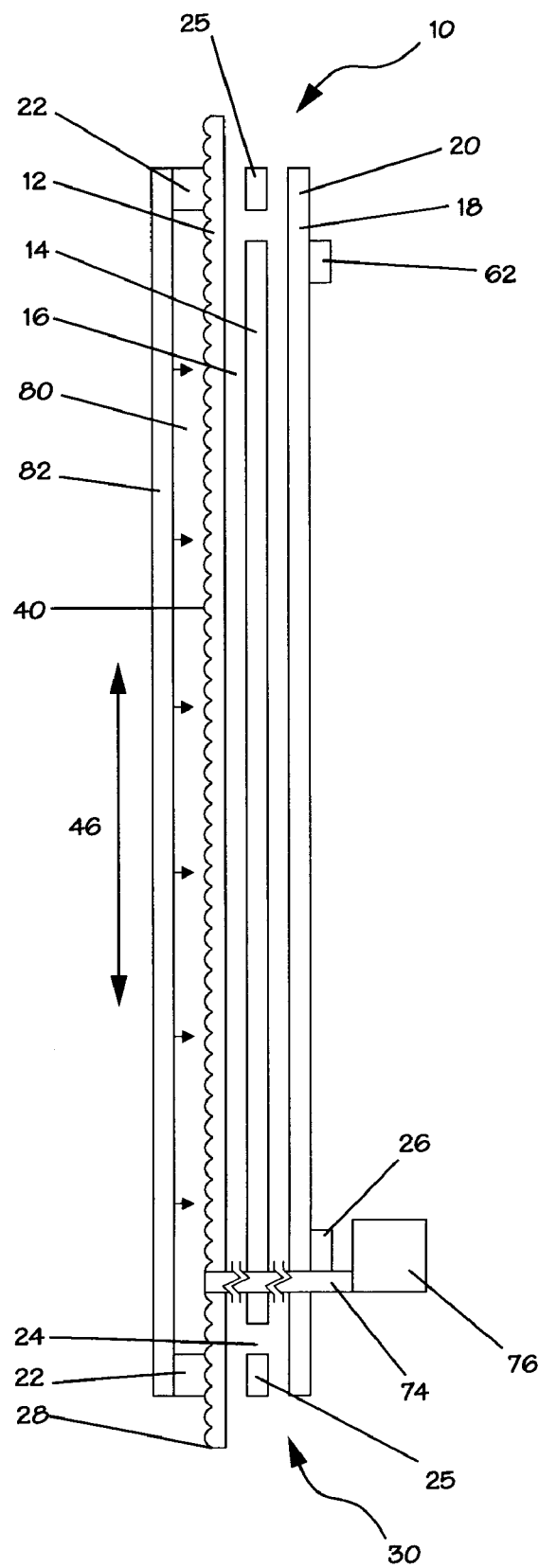
FIG. 3—Illustrates a side view of the lenticular display assembly with a second sealed chamber.
Figure 4:
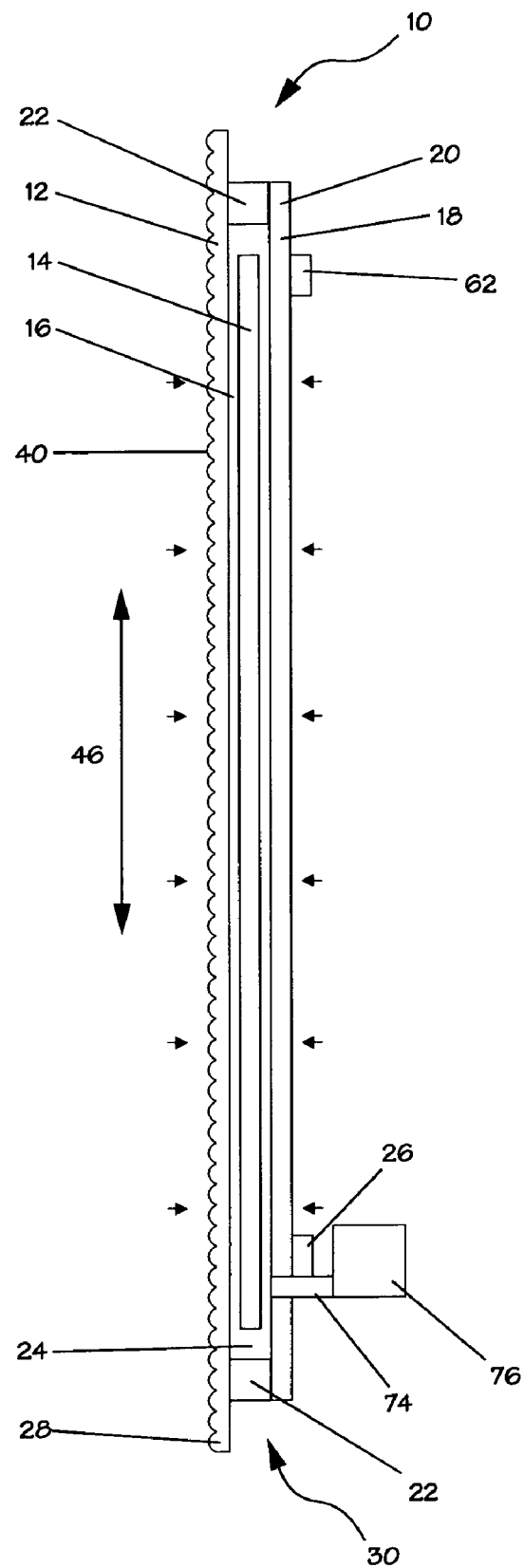
FIG. 4—Illustrates a side view of the lenticular display assembly utilizing a sealed chamber.

FIGS. 2 through 5 show the lenticular display assembly 10 comprises a lenticular lens plate 12, a lenticular image plate 14, means for maintaining the intimacy of the relationship 16 between the lenticular image plate 14 and the lenticular lens plate 12, and a rigid back plate 18. The lenticular image plate 14 is smaller than the lenticular lens plate 12 and is enclosed between the lenticular lens plate 12 and the rigid back plate 18. In the embodiments shown in FIGS. 2, 3, and 5, these two plates 12, 18 are preferably separated by a thin, narrow spacer 25 at their perimeter. This spacer 25 secures the relative positions of the lens 12 and back plate 18 and allows a minimum but adequate space for the graphic 14 to reside. The spacer 25 may be constructed from a closed-cell foam material, perhaps backed by adhesive for ease of installation. The rigid back plate 18 is illustrated as being slightly larger than the lenticular image plate 14 and slightly smaller than the lenticular lens plate 12, although the back plate 18 may actually be larger than the lens 12, as discussed previously. In the embodiment of FIG. 4, foam rubber stripping 22 is installed around the perimeter 20 of the rigid back plate 18, held in place by adhesive or other suitable means, and spaced apart laterally from the image plate 14 by an appropriate amount, so that the foam rubber stripping 22 does not interfere with movement of the image plate 14. The foam rubber stripping 22, or other structure capable of maintaining a relatively tight seal, forms a sealed chamber 24 where the lenticular image plate 14 can move in a parallel plane with the lenticular lens plate 12 and the rigid back plate 18. The foam rubber stripping 22 is attached to the lenticular lens by an adhesive, or other means of attaching such material that will maintain a relatively tight seal. A sealant, such as silicon sealant, is used at the joints to help attain the relatively tight seal of the sealed chamber 24.

Figure 7:
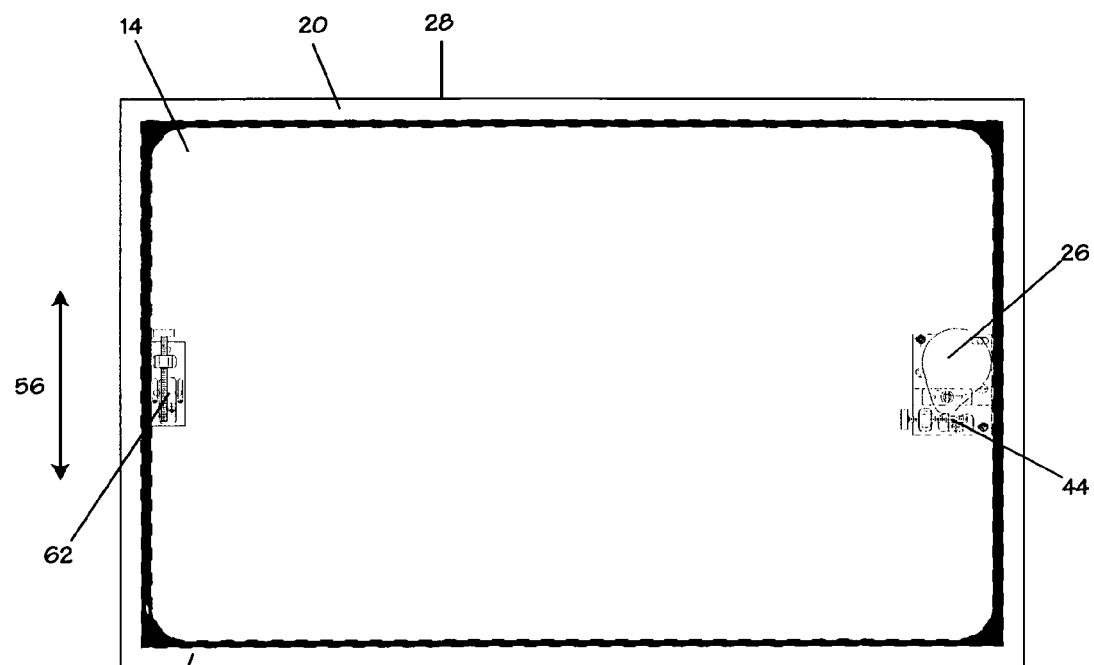
FIG. 7—Illustrates a back view of one embodiment of the lenticular display assembly.
Figure 6:
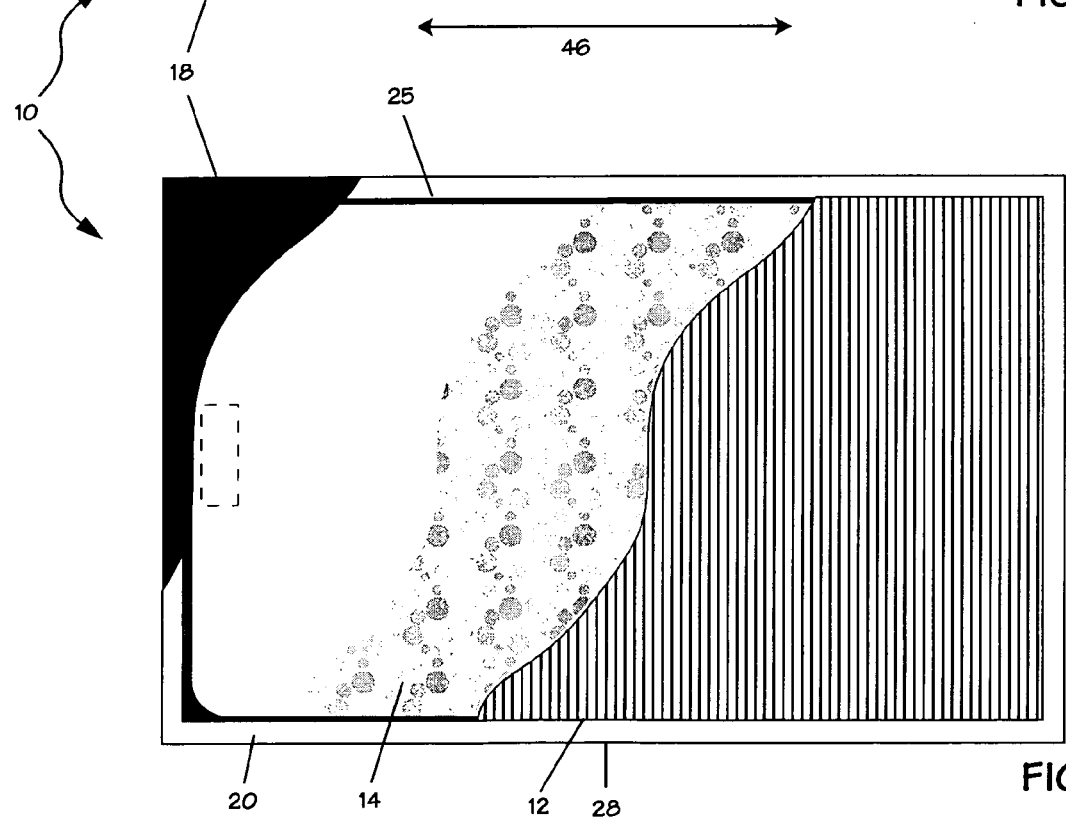
FIG. 6—Illustrates a front view of one embodiment of the lenticular display assembly.

Means for moving 26 the lenticular image plate 14 are placed away from the perimeter 28 of the lenticular display assembly 10 so as not to interfere with the installation of the lenticular display assembly 10 into existing signage display systems. The object is to minimize the thickness 30 of the lenticular display assembly 10 so that the lenticular display assembly 10 can be incorporated as any other "graphic image" and thereby fit into existing signage display systems. The means for movement 26 are preferably compact and do not obstruct the backlight capability of the image. FIGS. 7–9 show the preferred embodiment.

Preferably, the moving means 26 comprises an adjustable, off-center cam 32 residing within an elliptical opening 34 of a slider plate 36, the slider plate 36 having a drive pin 38. The off-center cam 32 translates the rotational travel force of the moving means 26, preferably a continuous or step motor, to the desired linear movement. The distance of travel necessary to display all the images is the width of one lenticule 40. The off-center cam 32 is designed to be adaptable to and cooperate with the specific dimensions of the lenticular lens plate 12 used. Thus the off-center cam 32 is capable of being changed depending upon the physical characteristics of the lenticular lens plate 12, i.e., the width of lenticule 40. The moving means 26, as shown in FIG. 8, is integrated with an adjustment plate 42 that includes a first alignment means 44, that confine the motion of the lenticular image plate 14 to the desired range.

Critical to the quality of the lenticular display presented, the lenticular display assembly 10 must ensure proper alignment of the lenticular lens plate 12 and the lenticular image plate 14 to perfect the presentation of the "first" and "last" image seen from a "head on" view. The first alignment means 44 is capable of adjusting the alignment of the moving means 26 along the axis of motion 46. See FIGS. 7 and 8.

A preferred embodiment of the first alignment means 44 is shown in FIG. 8. An adjustment housing 48 rides against a motor mounting plate 50. The slider plate 36 is adapted to the motor mounting plate 50 wherein the off-center cam 32 cooperates with the slider plate 36 and the drive pin 38 for motion of the lenticular image plate 14 along the axis of motion 46. The motor mounting plate 50 is attached to the rigid back plate 18.

In addition, the lenticular lens plate 12 and lenticular image plate 14 must be alignable along the axis 56 perpendicular to the motion of the lenticular image plate 14. A second alignment means 58, preferably similar to the first alignment means 44 shown in FIG. 10, adjusts the lenticular image plate 14 in relation to the lenticular lens plate 12. In one configuration, a second alignment means 58 is located on the motor mounting plate 50 with the drive pin 38 (FIG. 8). In a second configuration, the second alignment means 58, i.e., pin 60 is on a separate plate assembly 62 (FIG. 10).

FIG. 9 shows the drive pin 38 and alignment pin 60 protrude through the rigid back plate 18 of the chamber 24 so that the lenticular image plate 14 is mounted via the drive pin 38 and alignment pin 60. The lenticular image plate 14 has a hole and grommet 64 that receives the drive pin. Similarly, the lenticular image plate 14 has alignment slot 66 that receive the grommet 68 and alignment pin 60. The alignment slot 66 restricts movement of the lenticular image plate 14 in a direction substantially parallel to the direction of the alignment slot 66. The adjustment of the alignment pin 60 is in a direction substantially perpendicular to the direction of the alignment slot 66.

An important aspect of the self-actuating lenticular display assembly 10 is maintaining the "intimacy of the relationship" between the lenticular image plate 14 and the lenticular lens plate 12. If the lenticular image plate 14 is not maintained in an intimate relationship with the lenticular lens plate 12, "soft spots" occur in the displayed image. A "soft spot" describes the blurred lenticular display or portion of the lenticular display that is produced when the intimacy of the relationship 16 is not maintained and the image resides outside of the focal length of the lens. The "soft spot" is an undesirable condition that detracts from the presentation of an effective lenticular display.

Means for maintaining the intimacy of the relationship 16 of the lenticular lens plate 12 with the lenticular image plate 14 is provided to prevent soft spots from occurring. The object is to maintain the lenticular image plate 14 and the lenticular lens plate 12 together so that the intimacy of the relationship 16 is maintained. See FIGS. 2–4.

Figure 5:
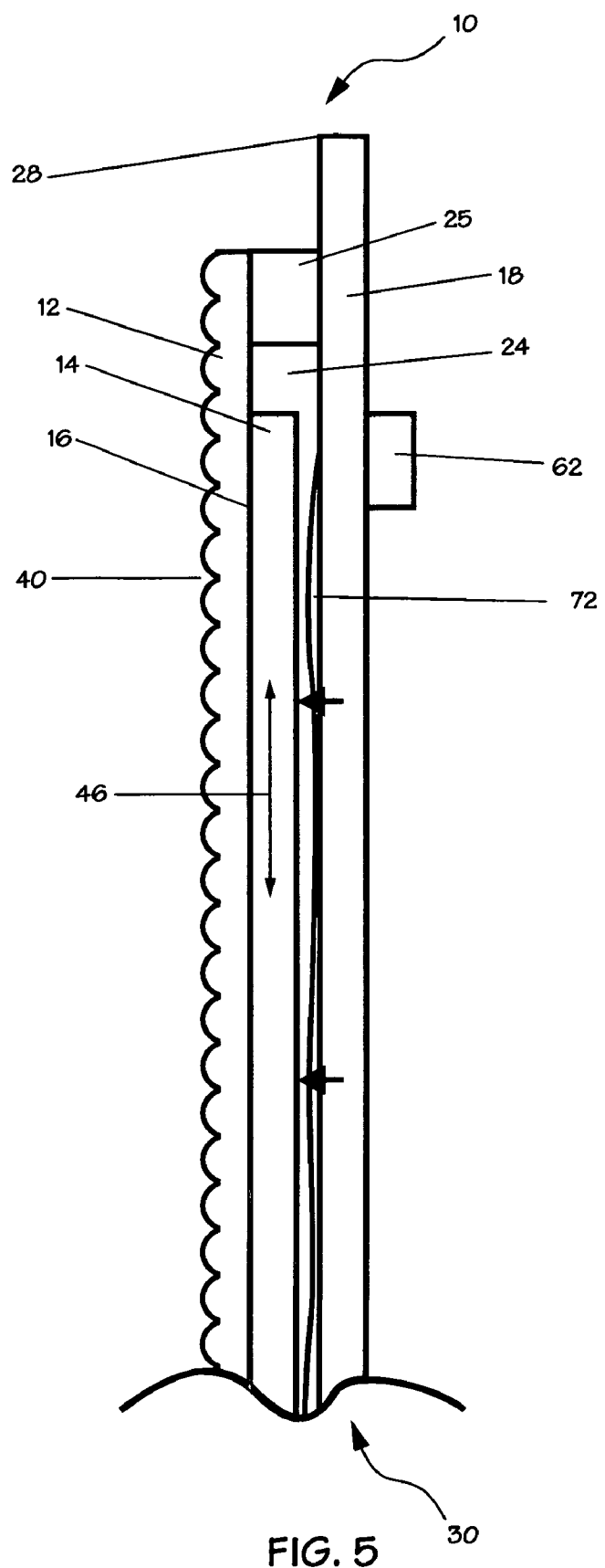
FIG. 5—Illustrates a side view of one embodiment of the lenticular display assembly with an inflated sealed bladder.

Preferably, the means for maintaining the intimacy of the relationship 16 comprises an inflated sealed bladder 72 made of flexible material such as thin plastic sheeting attached to the rigid back plate 18 by adhesive or other means that will maintain a relatively tight seal between the flexible material and the rigid back plate 18 as shown in FIGS. 2 and 5. The flexible material must be transparent when the lenticular display assembly 10 is constructed to be used in a light box display that provides light from behind the lenticular display assembly 10. The sealed bladder 72 can however be made of non-transparent material if the lenticular display assembly 10 is constructed to be used in an application that will not utilize back lighting. The sealed bladder 72 is inflated by way of a hose 74 connected to a motorized air pump 76 that pumps air through the hose 74 and into the sealed bladder 72. The motorized air pump 76 can be mounted to the back of the rigid back plate 18, or the motorized air pump 76 may be placed in a remote location from the lenticular display assembly 10.

Due to the flexibility of the sealed bladder material, the pressure that is produced within the sealed bladder 72 expands the sealed bladder 72 into the chamber 24. The rigid back plate 18 maintains the original size and volume of the chamber 24 so that as the sealed bladder 72 inflates, the volume within the chamber 24 decreases. Accordingly, as the sealed bladder 72 inflates, it pushes the lenticular image plate 14 toward the lenticular lens plate 12 to attain the desired intimacy of the relationship 16. The internal pressure of the sealed bladder 72 can be altered to control the intimacy of the relationship 16 between the lenticular image plate 14 and the lenticular lens plate 12 thereby effectively eliminating any soft spots that may occur. The amount of pressure is critical to the operation of the lenticular display assembly 10, as too little pressure will not prevent soft spots from forming, and too much pressure will prevent the lenticular image plate 14 from moving in intimate relationship with the lenticular lens plate 12. Typically, less than 3 p.s.i. is required to maintain the intimacy of the relationship 16 between a lenticular lens plate 12 measuring 48"×36" and a lenticular image plate 14 that measures 45"×33".

The clearance area 78 between the holes and the drive pin 38 and alignment pin 60 that protrude through the holes are sealed by placing adhesive tape around the drive pin 38 and the alignment pin 60. Rubber O-rings or other like structures can also be used around the drive pin 38 and alignment pin 60 to maintain the seal.

Alternatively, the means for maintaining the intimacy of the relationship 16 comprises using the sealed chamber concept to deflect the lenticular lens plate 12 toward the lenticular image plate 14. A second sealed chamber 80 is formed between the lenticular lens plate 12 and a rigid protective cover 82 that may be employed to protect the lenticular lens plate 12 as shown in FIG. 3. Foam rubber stripping 22, or other structure capable of maintaining a relatively tight seal, is adhered to the rigid protective cover 82, and is in turn adhered to the outside of the lenticular lens plate 12. A sealant, such as silicon sealant, is used to help attain the relatively tight seal within the second sealed chamber 80.

The second sealed chamber 80 is pressurized by way of a hose 74 connected to a motorized air pump 76 that pumps air through the hose 74 and into the second sealed chamber 80. As the second sealed chamber 80 pressurizes, the lenticular lens plate 12 deflects toward the lenticular image plate 14 as the rigid protective cover 82 resists deflection. The deflection of the lenticular lens plate 12 toward the lenticular image plate 14 attains the intimacy of the relationship 16 that is necessary to eliminate soft spots and provide an effective lenticular display.

This embodiment of the means for maintaining the intimacy of the relationship 16 does not require sealing of the clearance area 78 between the holes in the rigid back plate 18 and the drive pin 38 and alignment pin 60 that protrude through the holes due to the second sealed chamber 80 being located on the opposite side of the lenticular lens plate 12. The overall thickness 30 of the lenticular display assembly 10 is increased due to the second sealed chamber 80, however, the rigid protective cover 82 can be sized such that it does not interfere with the intended goal of providing a lenticular display assembly 10 that is capable of being used in an existing signage display system or light box display.

Figure 12:
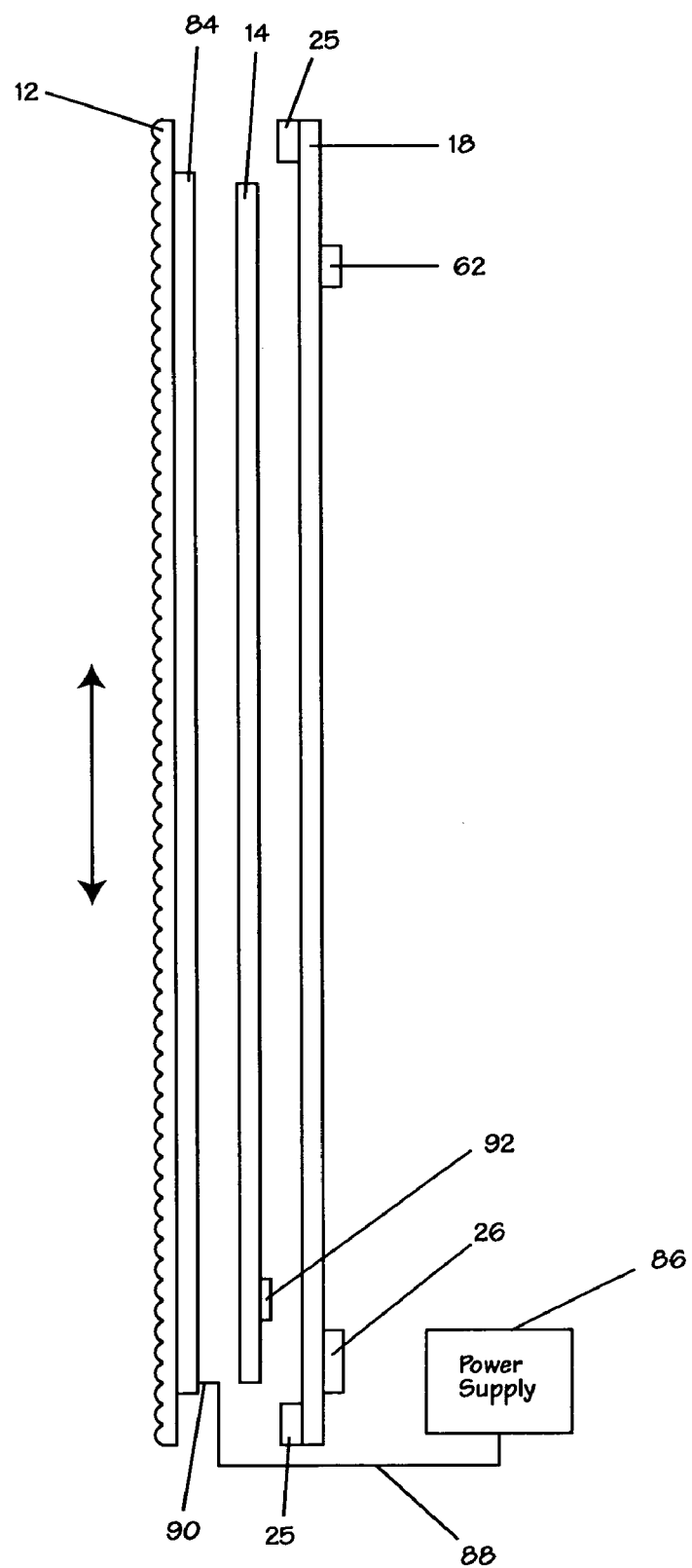
FIG. 12—Illustrates a side view of an exemplary embodiment of a display assembly utilizing electrostatic means for intimacy of contact between the graphic image plate and lenticular lens plate.

As noted above, alternative embodiments that also ensure the requisite degree of intimacy between the lenticular lens and the underlying graphic image plate are also possible. FIG. 12 shows a system in which a transparent conductive film 84 is applied to the back surface of the lenticular lens plate 12. A D.C. (direct current) power supply 86 having output current limiting, as is well-known in the applicable art, is coupled via an insulated electrical conductor 88 to the surface of the conductive film 84 at a connection point 90. The connection of the electrical conductor 88 at the attachment point 90 may be achieved in a number of ways, such as by application of a conductive adhesive, for example, that forms a conductive bond between the film 84 and the conductor 88. Of course, the conductor 88 should have an insulating portion surrounding it, except at and near the connection point 90, for the sake of safety.

Naturally, since the power supply 86 is current limited, any safety issues involved are nearly insignificant. When the power supply 86 is energized, there is an inrush current to the conductive film 84 that represents transport of electric charge to the initially uncharged conductor 84. Because of the current limiting in the power supply, it may take from several seconds to several minutes for an adequate charge to be delivered to the conductive film 84. The voltage maintained at the output of the supply 86 (to which the conductor 88 is coupled) may be quite high, on the order of 500 to 5000 volts, for example. As the conductive film 84 becomes fully charged, the need for charging current decreases.

After charging is successfully completed, the charge distribution on the conductive film 84 is believed to be substantially uniform. This charge attracts the underlying graphic image plate 14 into intimate contact with the conductive film 84, while still allowing the drive assembly 26 to move the graphic 14 with respect to the lens 12 in order to achieve the desired image animation. It is thought that some charge leakage occurs, and therefore it is necessary to maintain the connection between the power supply 86 and the conductive film 84.

Experiments have indicated that modifications may be made to the illustrative configuration without adversely impacting operation. For example, electrical contact between the power supply 86 and the conductive film 84 may be made at multiple points to ensure a uniform charge distribution. It is also theoretically possible to charge both the graphic image plate 14 (after applying a transparent conductive film to the image plate 14 as well) and the lens 12 to further encourage intimacy of contact, although this is not illustrated in the drawings. Experiments have also shown that adding a second electrode, either grounded or supplied with an opposite charge, applied to either the graphic or the back plate, can substantially increase the pull of the image to the lens, or can supply the same pull while requiring less voltage to do so.

It has also been observed that the graphic image plate 14 may not adhere uniformly to the lens plate 12 under all circumstances using the electrostatic technique described above. To ensure uniform adherence, and proper intimacy of contact, a stiffener strip 92 may be attached laterally to the back surface of the graphic image plate 14. This stiffener 92 may simply be a strip of plastic, such as polycarbonate, that can be attached to the graphic 14 by taping, for example, or through use of an appropriate adhesive. It is also possible to employ a second stiffener strip, in a similar lateral configuration, near the opposite end of the graphic image plate 14, although this configuration is not illustrated in the drawings.

Figure 13:
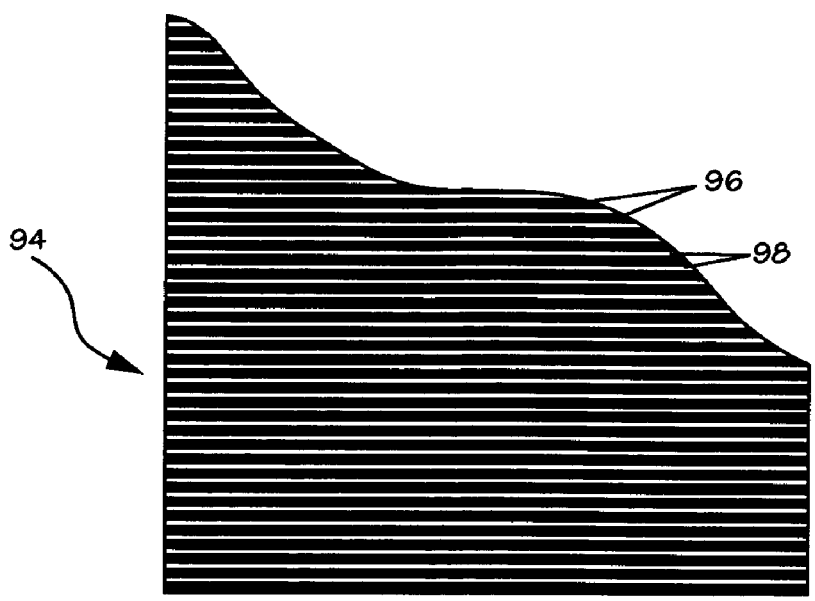
FIG. 13—Illustrates a partial front view of an alternative means for image resolution.

As noted previously, the lenticular lens 12 serves the purpose of resolving the images stored on the graphic image plate 14 for the benefit of a distant observer. Another means for image resolution may also be incorporated in any of the illustrative embodiments discussed above. FIG. 13 is a partial front view of a barrier strip 94 that may be substituted for the lenticular lens plate 12 in any of the embodiments discussed above. As shown in FIG. 13, the barrier strip 94 employs a collection of laterally extending opaque regions 96 alternating with transparent regions 98. The effect is that of a series of "bars" running across the face of the barrier strip 94; hence its name. Both a barrier strip or a lenticular lens may serve as a means for resolving an image. Because of this functionality, both a barrier strip and a lenticular lens may be termed an image resolving plate, or a means for resolving an image.

The barrier strip geometry permits selected regions of the underlying graphic image plate to become visible through the transparent portions 98 as the image plate is moved. This serves essentially the same purpose as the lenticular lens plate 12 described in conjunction with the several embodiments of the present invention. It is worth considering that, in addition to simple "morphing" (metamorphosing), in which an image changes its character as it is moved with respect to the overlying resolving means, the system described can also be utilized for purposes of animation. Of course, a number of disparate images may be stored on the graphic image plate, and proper resolution of the images depends upon the appropriate image "lines" being properly aligned with the transparent regions of the barrier strip. By adapting the "cam" used to regulate the movement of the drive pin that moves the image, an animation sequence can be displayed, and the graphic restored to its "start" position by an abrupt "flyback" movement of the drive pin. The animation sequence can then be repeated.

The number of different images that can be included on a graphic image plate usable with the present invention is to some degree dependent upon resolution concerns. For the barrier strip implementation, for example, three distinct images can be reproduced using a barrier strip aspect ration of 4:1 (that is, the width of the opaque bars is four times greater than the width of the transparent bars). Needless to say, resolution of the resulting image will suffer if the aspect ratio were extended to 8:1 for the purpose of displaying more different images. An 8:1 ratio would increase the resolving power of the barrier and would allow more images to be seen, but such an increase in aspect ratio also reduces the light output substantially (⅞ of the light would be held back) and the resulting image output would appear relatively dark. One reason that three images can be used effectively at the 4:1 ratio is that the stroke of the motor-driven motion does not cover the full width of a lenticular.

Figure 14:
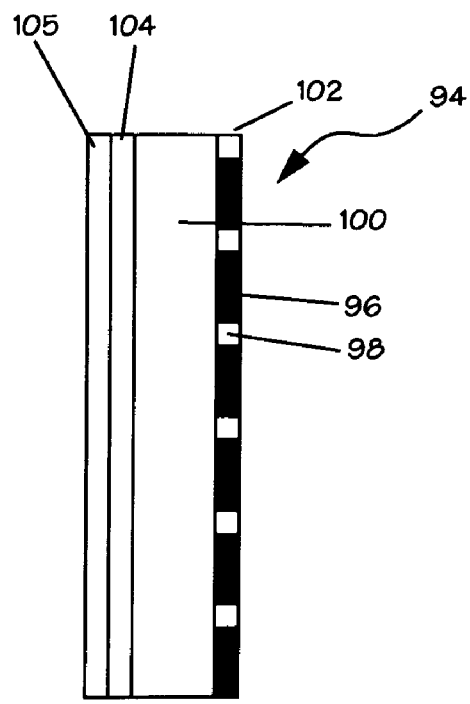
FIG. 14—Illustrates a side section view of the means for image resolution depicted in FIG. 13.

FIG. 14 illustrates one form of the barrier strip 94 in section view. It is both economical and fully functional to manufacture the barrier strip 94 as a laminate film, in which a dimensionally stable carrier, layer 100, has printed on one side the alternating region of opaque and transparent bars 102, and a transparent conductive layer 104 is bonded to the opposite laminate surface. Adding a layer of optically clear adhesive over the conductive layer would make the assembly all the more efficient in construction. The actual order in which the layers appear is not particularly important in application; it is simply their combined presence that is significant. This construction of a barrier strip laminate reduces the cost of the resultant display system, allows the use of electrostatic adherence technology for intimacy of contact, and would even permit "upgrade kits" to be prepared economically for the purpose of adapting existing display systems to the instant technology.

Figures 16, 17:
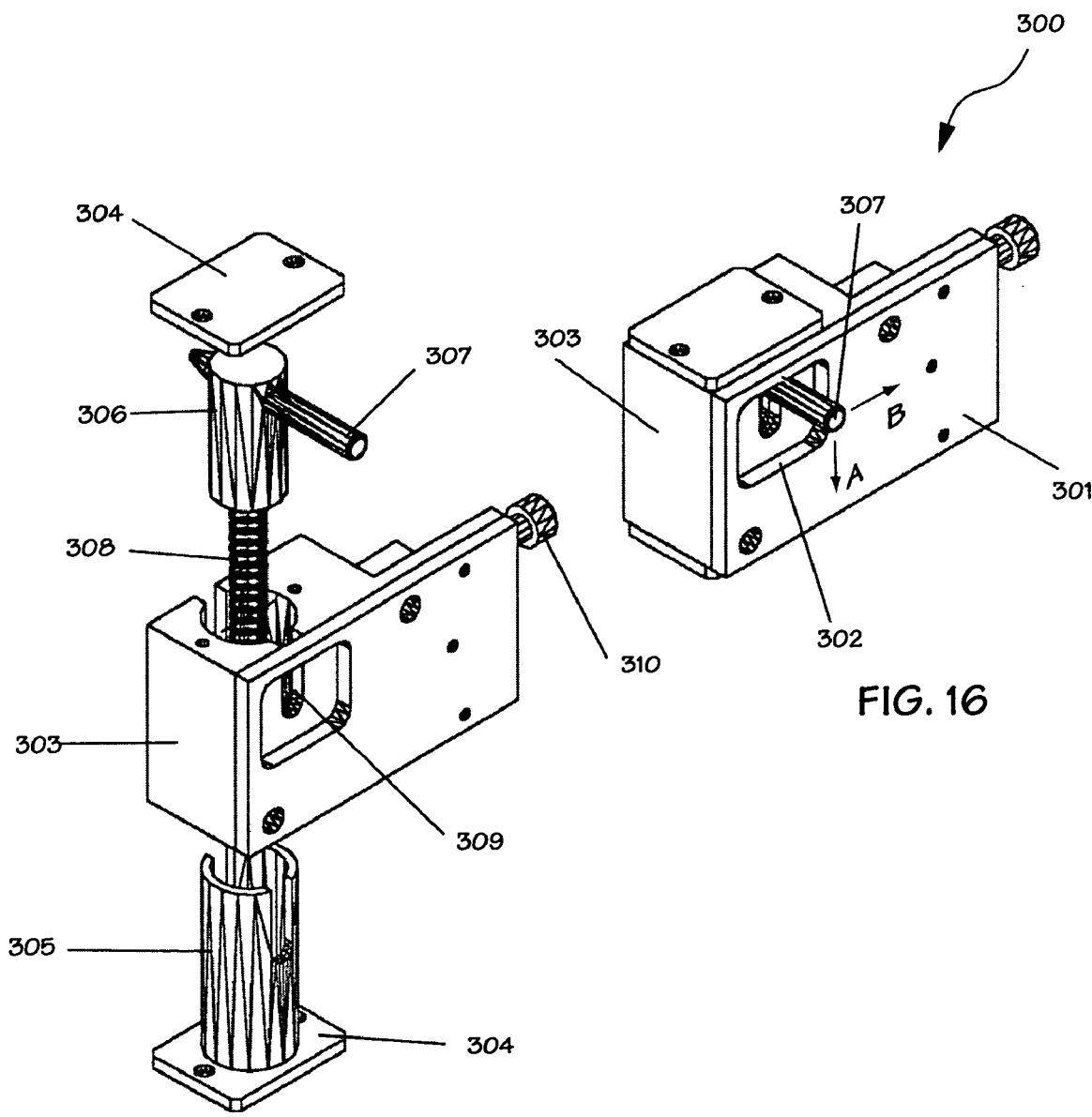
FIG. 16—Illustrates a perspective view of an alignment means adapted to provide tensioning for a graphic image plate.
FIG. 17—Illustrates a perspective view of the alignment means of FIG. 16, partially disassembled.

An alternative arrangement for achieving proper alignment of the graphic image plate with respect to the lenticular lens plate or other suitable image resolving device is illustrated in FIGS. 16 and 17, generally depicted by the numeral 300. The alignment device 300 is preferably constructed of metal, although plastic of suitable structural integrity would also serve in this application. The device 300 includes a front plate 301 that is firmly affixed with respect to the back plate of the display device. Of course, since one will recognize that alignment of the graphic with respect to a lens or barrier strip is the ultimate goal, it is only necessary that the front plate of the alignment device remain stationary with respect to the lens or barrier strip. Since the construction of the display devices in accordance with the present invention generally contemplates that the lens (or barrier strip) is fixed in position with respect to the back plate, affixing the front plate 301 so that it is stationary with respect to the back plate of the display device is sufficient. This suggested arrangement should not be interpreted to exclude affixing the front plate 301 to the lens in some operationally appropriate fashion, however.

The front plate 301 further includes an opening 302 therein. The opening 302 is illustrated as being generally square in shape, although it will become apparent that the opening 302 need only be large enough to accommodate a useful range of adjustment. In addition to providing an alignment capability, the alignment mechanism 300 is designed to introduce a prescribed tension to the graphic image plate in order to encourage smooth and unencumbered movement of the graphic image plate with respect to the lens, barrier strip, or other image resolving mechanism.

To realize this tensioning capability, a helical spring 308 of suitable stiffness is installed within two mating sleeves 305, 306. One of the sleeves 306 is slightly smaller in outside diameter than the inside diameter of the other sleeve 305, so that that sleeve 306 fits within sleeve 305, leaving ample room for relative reciprocal motion. In the preferred form, the smaller sleeve includes an opening therethrough to accommodate a pin 307. The pin is adapted and arranged to engage a grommet in the graphic image plate in much the same way as described above with reference to the moving and aligning devices of FIGS. 8 through 11.

When the sleeve arrangement 305, 306 and its enclosed spring 308 are assembled, top and bottom plates 304 secure the sleeve arrangement within a recess in the back cover 303, and allow the pin 307 to protrude through an elongated opening 309 that communicates with the recess. Once assembled, when the pin 307 moves in the direction of arrow A (FIG. 16), the spring 308 compresses further, providing an appropriate bias opposite the direction of arrow A. Once the alignment mechanism 300 is appropriately installed, rotation of knurled knob 310 adjusts the pin 307 from side to side, in the direction of arrow B (or opposite arrow B, as desired). This lateral adjustment capability is achieved in much the same manner as described above with respect to FIGS. 8 through 11.

In the present alignment mechanism 300, the knurled knob 310 is coupled to a threaded shaft that rotates within a nut (not shown) that is affixed to the back cover 303 of the alignment mechanism 300. The back cover is slidably coupled to the front plate by known means, such as the provision of elongated mounting holes in the back cover or a tab and slot arrangement, although the specific method is not illustrated in the drawings. This allows the back cover (and the enclosed pin 307) to move laterally with respect to the front plate 301, thus effecting the desired lateral adjustment. It should be noted that providing tension for the graphic image plate may well obviate the need for additional stiffeners attached to the graphic image plate, thus streamlining the installation procedure when graphics are replaced in existing signage.

Figure 15:
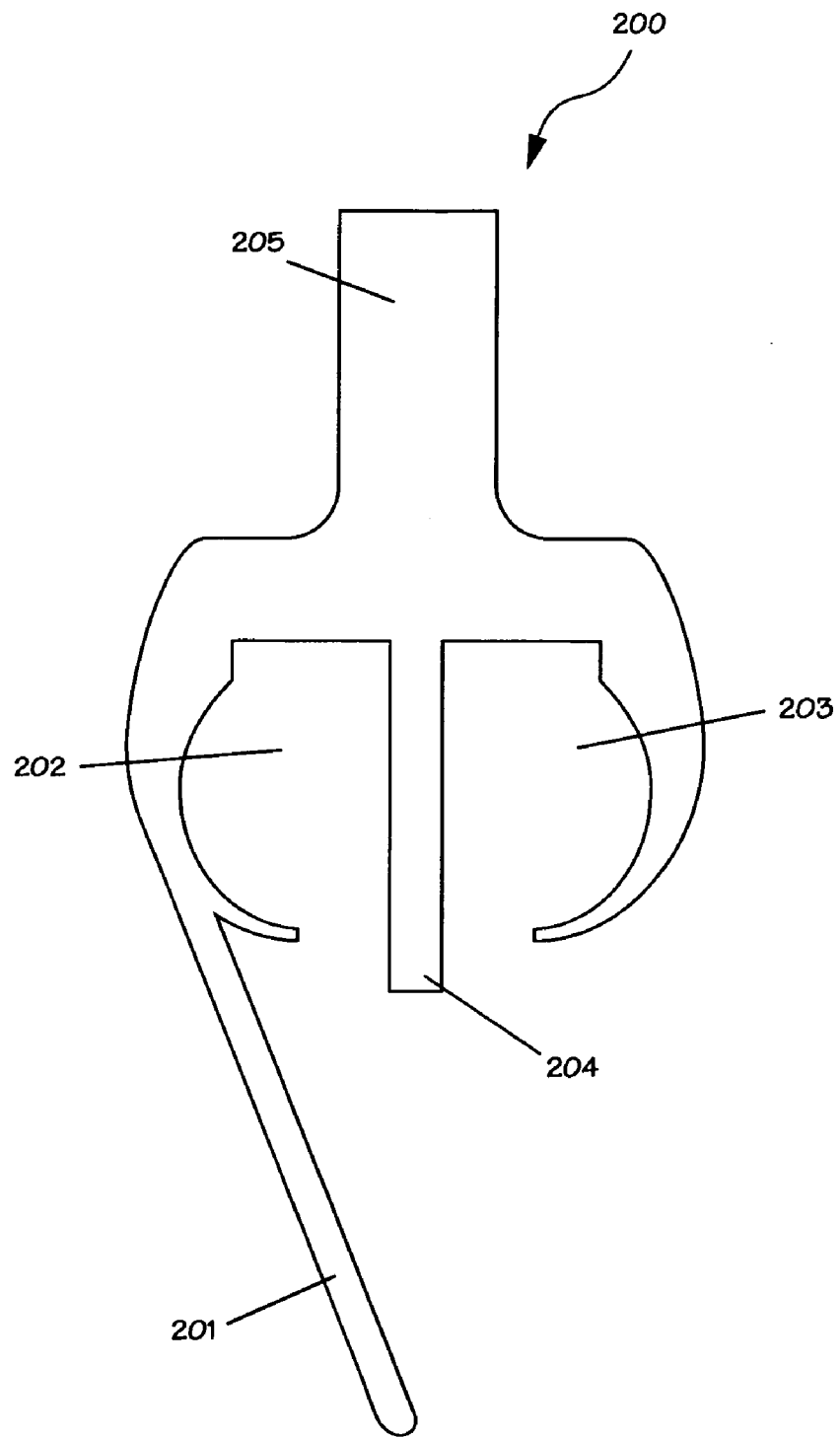
FIG. 15—Illustrates a side section view of an extrusion suitable for attachment to the lens plate and back plate.

For ease of assembly of the lenticular display system describe above, an extrusion such as the one illustrated in FIG. 15 may be employed. As can be appreciated from an examination of the Figure, the extrusion 200 is designed to "snap" onto the perimeter of the lens plate and back plate. The extrusion 200 includes an integrally formed extension 201 that overlaps the perimeter of the lens plate to provide a seal against the environment. The lens plate is held in place within first cavity 202, while the back plate perimeter fits within second cavity 203. An integrally formed intervening portion or flap 204 provides the required spacing between the lens plate 12 and back plate 18, and thereby creates the space where the graphic resides. The extrusion 200 also features a thin protrusion 205 from its perimeter that creates the thin profile required to fit existing fixtures. Ease of assembly, disassembly, and re-assembly are key features of a useful and economically viable display assembly that allows easy replacement of graphic images and that is completely compatible with existing display enclosures.

Although not suggested above in the discussion of the preferred forms of the invention, it is also contemplated that both the drive mechanism and the alignment mechanism could be moved to the front of the display unit, instead of being mounted to the back side of the back plate. This arrangement has an immediate advantage when used in conjunction with the bladder arrangement of FIG. 2. One of the reasons for installation of grommets in the graphic image plate is to allow for motion of the graphic image plate induced by the bladder. In other words, the bladder tends to push the graphic away from the drive and alignment pins, necessitating the use of grommets to permit graphic travel without disengaging the pins. This difficulty would be eliminated by front mounting of the drive and alignment mechanisms, since the action of the bladder would now tend to further engage the pins with the graphic image plate instead of pushing the image plate away. Furthermore, rear installation of the drive and alignment mechanisms requires that slots be provided in the bladder to accommodate the pins, adding to the fabrication cost of the bladder. This necessity of slots in the bladder is also eliminated by front installation of the drive and alignment mechanisms.

An additional advantage of front alignment is that the requirement for space within a display housing to accommodate the drive motor is also eliminated. When the drive mechanism is moved to the front, it can be enclosed within a housing or cowling to protect it from the environment, but it would no longer require a space allocation within the display housing. This would allow easier retrofitting of existing signage with the self-actuating displays of the present invention.

Figure 18:
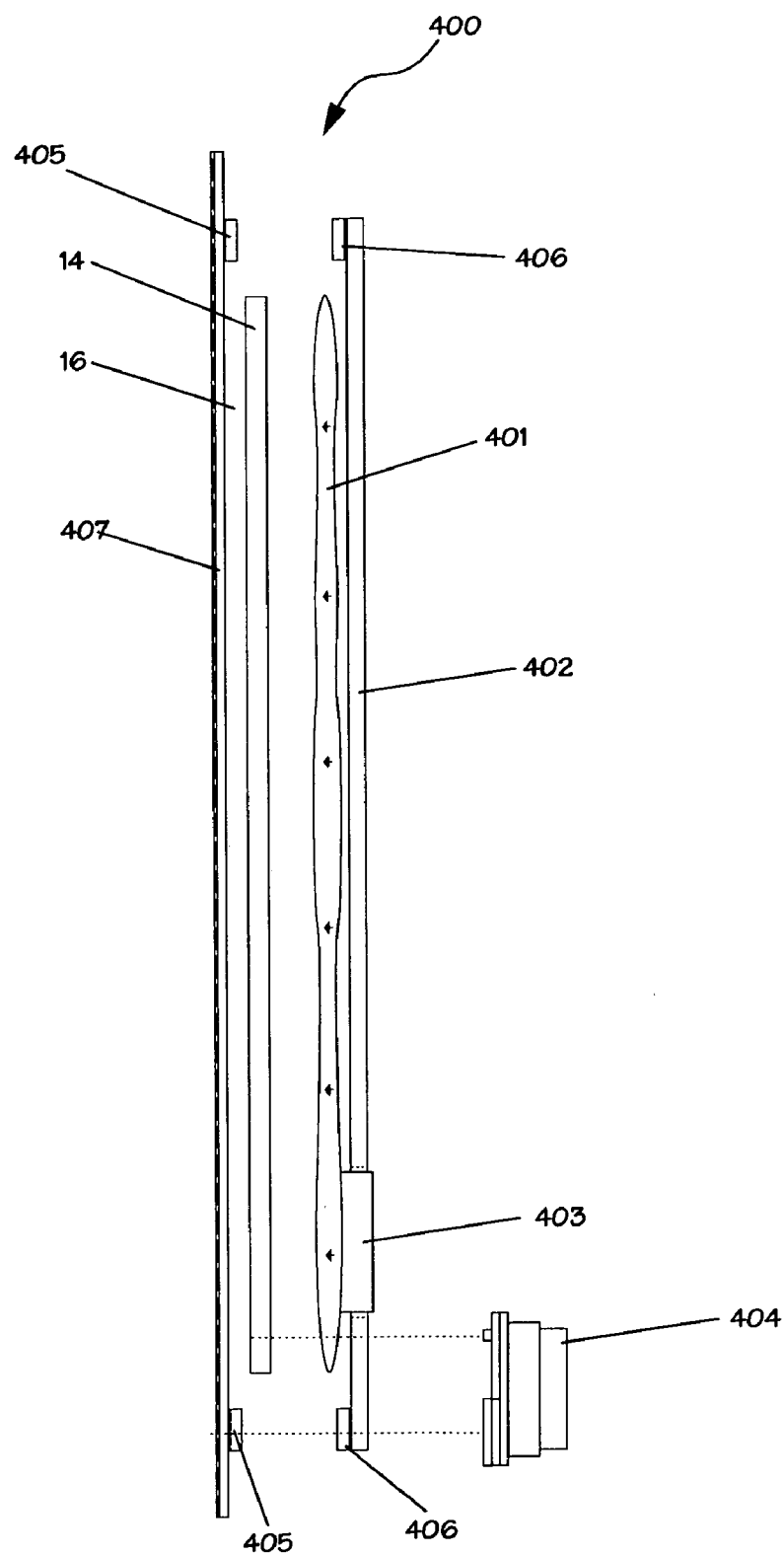
FIG. 18—Illustrates yet another embodiment of a lenticular display assembly in accordance with the present invention.

Yet another embodiment of a lenticular display assembly in accordance with the present invention is illustrated in FIG. 18 and generally depicted by the numeral 400. In a fashion very similar to the operation described previously in conjunction with other embodiments of the present invention, the display assembly 400 provides a means 407 for resolving images stored on a graphic image plate 14 for the benefit of a relatively distant observer. The means 407 may be a lenticular lens as described above, or a barrier strip 94 as shown in FIGS. 13 and 14, for example.

The assembly 400 further includes a back plate 402 that may be formed from a plastic material similar to that used for the image resolving plate 407, although a range of suitable materials exists for the back plate 402. The material selected should demonstrate a reasonable flexibility and durability, since a completely rigid back plate is unnecessary in this embodiment. The back plate 402 may be as thin as approximately 10 mils (0.010 inch) in thickness.

Of course, since the display assembly 400 is designed for backlighted applications, the back plate 402 should be relatively transmissive of visible light, and, if the graphic 14 is self-diffusing, is preferably completely transparent. Something needs to diffuse the image of the bulbs in the light source provided at the rear of the enclosure, otherwise the lighting may be rather uneven. In the preferred form of the invention, the imaging material from which the image plate 14 is fabricated has a diffuser built in. If the graphic did not have this feature, one of the other layers (either the stiffener plate or the back plate 402) should provide it. A transparent back plate 402 maximizes visibility of the graphic.

Preferably, the back plate 402 is removably attached to the image resolving plate 407 by Dual Lock™ reclosable fastener material manufactured by 3M of St. Paul, Minn. In the preferred form of the invention, mating regions of the Dual Lock™ material are secured to facing perimetric portions of both the back plate 402 and image resolving plate 407, allowing the display unit to be assembled and disassembled with relative ease. The Dual Lock™ material is hermaphroditic, so it is unnecessary to select a particular type of fastening material for each mating surface. It is also an advantage that the Dual Lock™ material is a bit easier to engage and disengage than other known reusable fastening systems, and it is thus easier to change the image.

In the alternative, the removable securement of the back plate 402 to the image resolving plate 407 may be accomplished by using mating regions of hook-and-loop fastener material, such as the material commonly called VELCRO™. Preferably, strips carrying the hook-type material 406 are attached by adhesive to an interior, perimetric (disposed near the perimeter) area of the back plate 402, while mating strips of the loop-type material 405 are secured to interior regions of the perimeter 28 of the image resolving plate 407. Of course, the hook-type material 406 may be attached to the image resolving plate 407, and vice versa.

A means 401 for maintaining intimacy of relationship between the image plate 14 and the image resolving plate 407 is also included in this embodiment. Preferably, the means 401 for maintaining intimacy comprises a plastic bag having exterior dimensions that closely approximate the size of the image plate 14. The plastic bag 401 is maintained in an inflated condition through the use of a fan 403. It is preferred that the fan 403 be of a conventional design suitable for ventilation applications, such as a TA150DC cooling fan manufactured by Nidec Corporation of Kyoto, Japan. In this application, the fan 403 has a sufficient airflow rating to keep the bag 401 inflated without the need for pressure regulating devices. In the preferred form of the invention, the fan 403 provides a static air pressure of about 0.05" (pressure equivalent to a 1" diameter column of water 0.05 inch tall).

Unlike the prior air bag implementation described above, in the present embodiment the air flow allows the bag to expand into the available space between the back plate 402 and the image plate 14. If the back plate 402 is tensioned (that is, not too stretchy) along the back, the air bag expands into the space provided and creates the slight pressure on the image plate 14 that is necessary to maintain proper intimacy between the image plate 14 and the image resolving plate 407.

Figure 19:
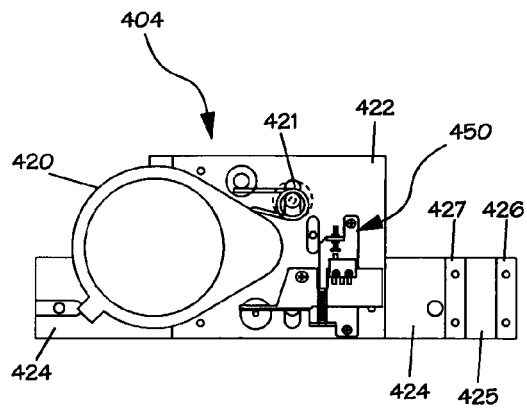
FIG. 19—Illustrates a front view of an integrally constructed drive motor and adjustment mechanism suitable for use with the lenticular display assembly of FIG. 18.
Figure 21:
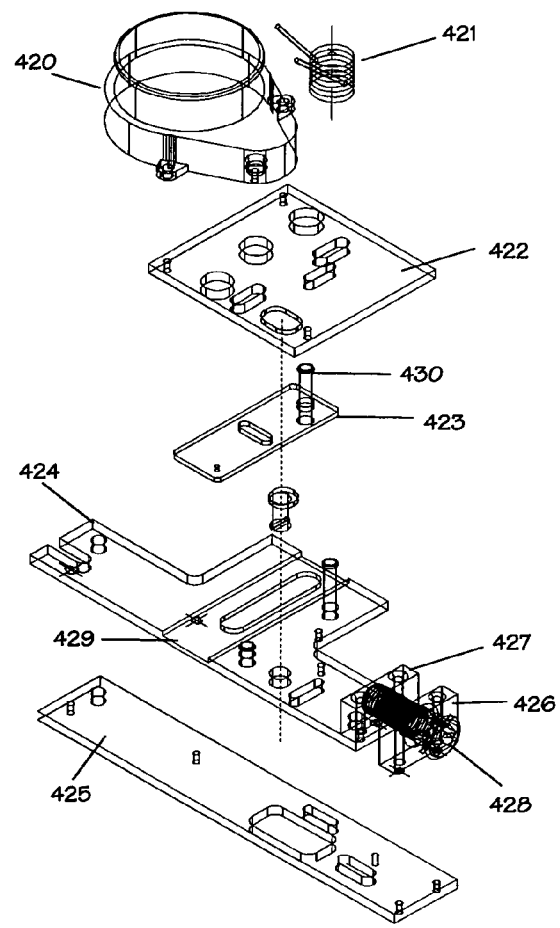
FIG. 21—Illustrates an exploded view of a portion of the integrally constructed drive motor and adjustment mechanism of FIG. 19.
Figure 20:
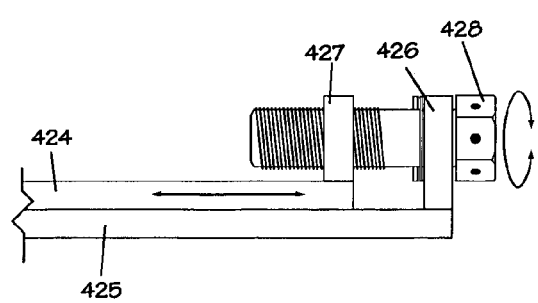
FIG. 20—Illustrates a side elevational view of an adjustment mechanism included in the integrally constructed drive motor and adjustment mechanism of FIG. 19.

FIGS. 19 through 21 illustrate the integrally constructed drive motor and adjustment mechanism 404 supported proximate one end of the assembly. The drive motor 420 is secured to fixed mounting plate 422. A torsion spring 421 provides suitable bias between the fixed plate 422 and transit plate 423 that moves along a groove 429 machined into movable plate 424. The drive motor 420 is constructed and arranged to produce linear motion of a drive pin 430 between a first position and a second position. This linear motion is what moves the image plate 14 with respect to the image resolving plate 407 (FIG. 18) such that the images on the image plate 14 are sequentially resolved for the benefit of a relatively distant observer.

As can be appreciated from an examination of FIGS. 20 and 21 in particular, movable plate 424 is also laterally adjustable with respect to base plate 425 through the use of adjustment bolt 428. This adjustment "tilts" the image plate slightly, if necessary, to ensure that the lines of the stored image are registered properly with the openings in the image resolving device; in most cases, a barrier strip, but the image resolving device could also be a lenticular lens as suggested above without loss of efficacy. In this embodiment, it is noteworthy that both adjustments have been located to the same mechanism, rather than having them at different ends of the assembly, as described with respect to previous embodiments. Although not illustrated in the drawing figures, the end of the image plate 14 opposite the drive and adjustment mechanism is preferably just a fixed peg or post that is inserted through the image resolving plate 407.

It may also be possible to produce the display system described herein without providing a specific adjustment for registration of the image with the image resolving device. Of course, in order to accomplish this, the display system itself would have to be manufactured with close tolerances, and the attachment point (or points) in the image plate itself would have to be positioned very accurately. It is estimated that a grommet (or simply an opening in the image plate) designed to accommodate the motor drive pin may have to be located to an accuracy of about 0.010 inch in order for the registration adjustment to be eliminated altogether.

Figure 25:
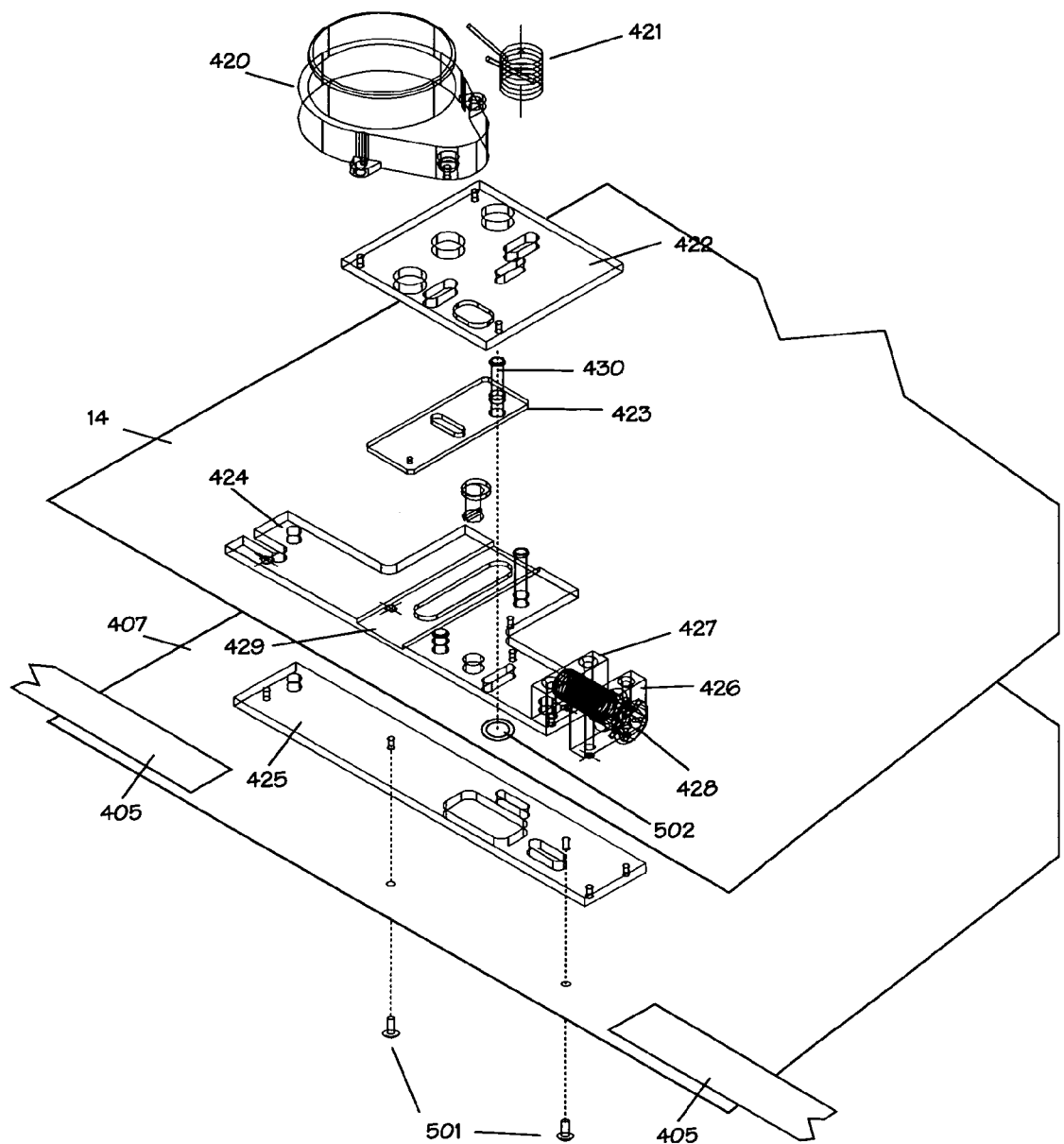
FIG. 25—Illustrates an exploded view depicting the technique used to mount the integrally constructed drive motor and adjustment mechanism to the display assembly.

The exploded view of FIG. 25 is illustrative of the technique used to mount the drive mechanism to the display assembly. The base plate 425 is secured to the image resolving plate 407 using rivets 501 as shown. Of course, the base plate 425 may be mounted using alternative means, such as, for example, screws and nuts, a powerful adhesive, or even ultrasonic welding, as long as the base plate 425 is retained securely in position. Portions 405 of the selected removable attachment means described above are visible along the perimeter of the image resolving plate 407. It should be noted that a gap in the attachment material 405 is provided to accommodate the base plate 425.

The movable plate 424 is secured to the base plate 425 beyond the perimeter of the image plate 14, with only the drive pin 430 making contact with the image plate 14 through opening 502. Of course, a grommet may be inserted in opening 502 to minimize wear of the opening 502 caused by interaction with the drive pin 430, although in some applications this grommet may be omitted so the drive pin can interact directly with the sides of the opening 502 in the image plate 14.

Figure 22:
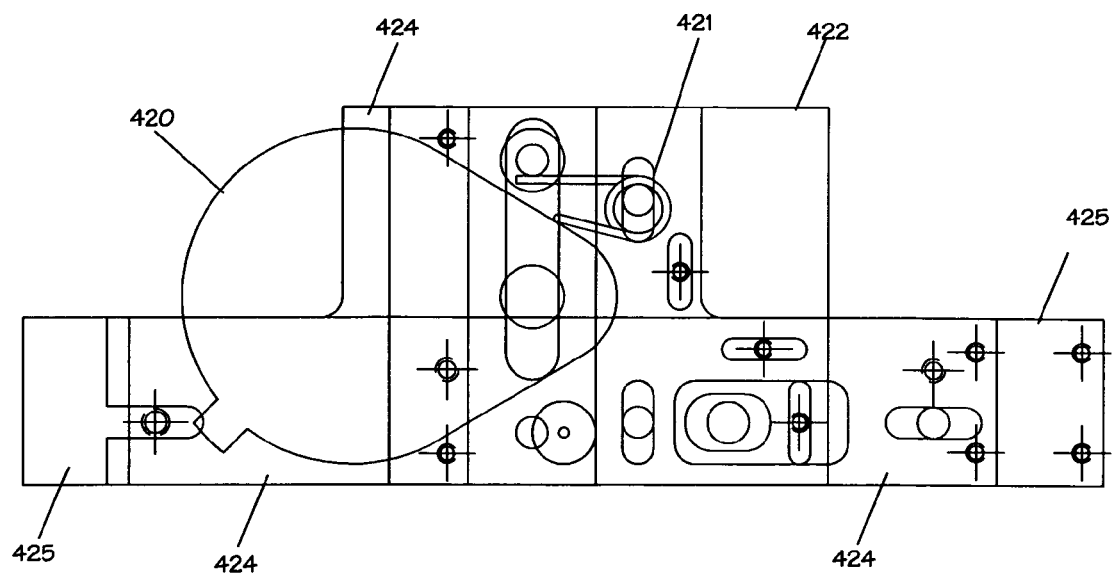
FIG. 22—Illustrates an enlarged view of a portion of the integrally constructed drive motor and adjustment mechanism of FIG. 19.
Figure 23:
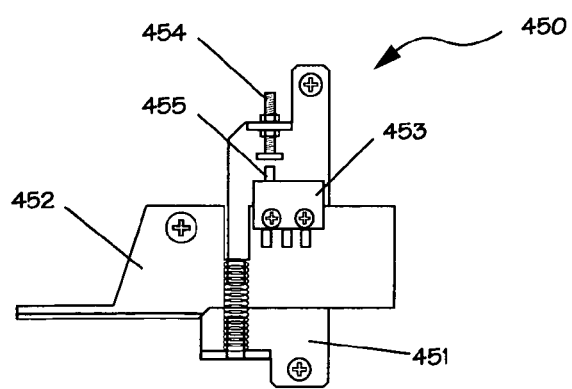
FIG. 23—Illustrates a portion of the integrally constructed drive motor and adjustment mechanism of FIG. 19 that stops the drive motor near the center of its lateral excursion, if desired.

FIG. 23 depicts adjustment mechanism 450 in greater detail. A switch 453 includes a delay relay connected in series with the drive motor 420 (FIG. 22). Whenever there is a dramatic change in switch circuit current, the relay de-energizes and interrupts power to the drive motor 420, while starting a timer to re-energize the motor 420. The delay is adjustable, and in the preferred form of the invention the delay is set for about three seconds. This three-second delay is suitable for use with the ten-RPM (revolutions per minute) drive motor 420. In the preferred embodiment, the delay timer is a Model 427 Timer manufactured by Automatic Timing & Controls of Lancaster, Pa. Of course, other delay devices may also by suitable in this application. A pin is provided on transit plate 423 (FIG. 21) on the opposite end from the drive pin 430. This second pin, of course, moves back and forth along with the transit plate 423.

During the course of its travel, when the pin comes into contact with pivoting arm 452, it drives the arm 452, and the switch 453 that is mounted to it, into contact with adjustable actuating screw 454. The actuating screw 454 comes into contact with switch actuator 455, which interrupts power to the drive motor 420 and starts the timer. After a time delay, the drive motor 420 is restarted and continues to drive the image plate 14.

The effect of the mechanism 450 is to stall the image plate 14 near the center position. Without a way to momentarily stop the drive motor 420, the center portion of the image plate 14 tends to go by quickly. The mechanism 450 allows the viewer a good look at the center image, then starts up the drive motor 420 once again.

Figure 24:
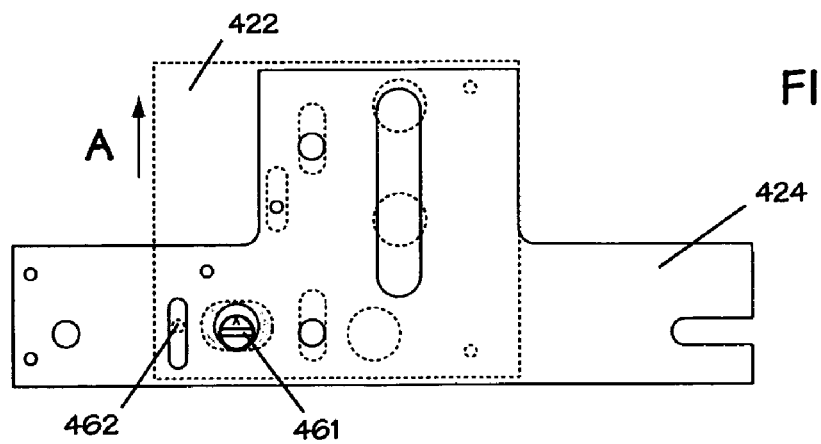
FIG. 24(a)—Illustrates the adjustment of the fixed mounting plate with respect to the adjustment plate to set the relative position of the image with respect to the image resolving plate near one extreme.
FIG. 24(b)—Illustrates the adjustment of the fixed mounting plate with respect to the adjustment plate to set the relative position of the image with respect to the image resolving plate near its central position.
FIG. 24(c)—Illustrates the adjustment of the fixed mounting plate with respect to the adjustment plate to set the relative position of the image with respect to the image resolving plate near its opposite extreme.
Figure 24:
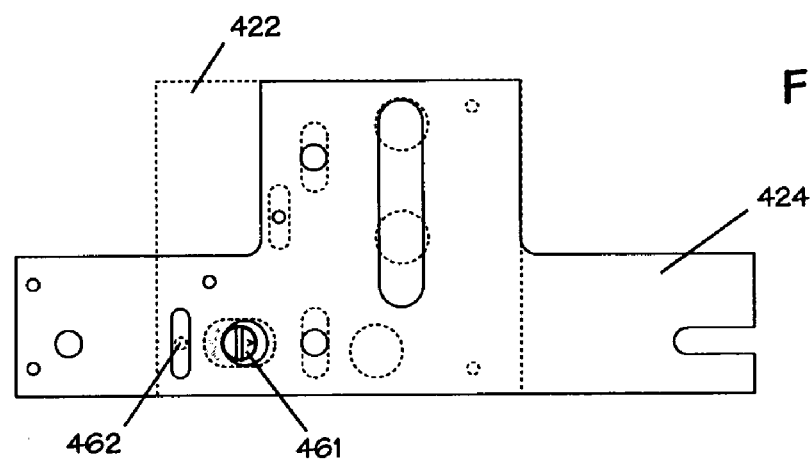
Figure 24:
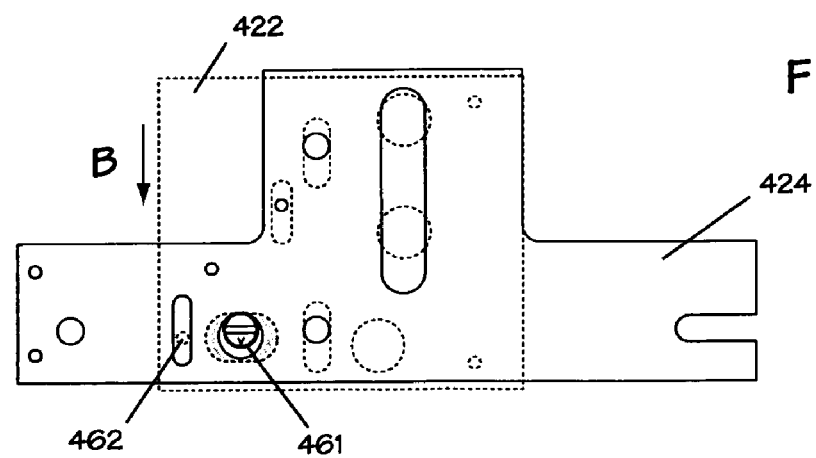

FIGS. 24(a) through 24(c) are illustrative of the range of adjustment of plate 422 with respect to plate 424. As can be appreciated from the several views, plate 422 moves in the direction of arrow A, [FIG. 24(a)] then reverses, returning to a central location [FIG. 24(b)] before traveling in the direction of arrow B [FIG. 24(c)]. The plate 422 then reverses direction and continues as described. The drive mechanism provides a reciprocal motion of the graphic image plate 14. This motion creates a visual image cycle for the observer. The adjustment of plate 422 with respect to plate 424 is necessary to set the relative position of the image 14 with respect to the image resolving plate 407 and therefore effect the correct image sequence for the viewer. A round shaft 461 is provided whose central axis is held in place by an opening in plate 424. The shaft 461 has a screw head on one end and an off-center cam on the other end. This off-center cam fits into a matching slot in plate 422. As the screw head is turned, plate 422 moves in response to the off-center cam and the image cycle is thereby altered. When the correct position is attained, a lock down screw 462 is tightened to set the relationship, and the adjustment is complete.

An interesting operational anomaly arises when a display system as described above is rotated 90 degrees, so that the image plate reciprocates from side to side instead of vertically. When the drive mechanism is run on its side, all the weight of the graphic image plate 14 is supported by the edge of slide 423 where it meets slot 429, and where the stud meets the graphic slot as shown in FIG. 25. This is a high friction situation and puts a great deal of destructive stress on the motor and bearing surfaces. The mechanism spring-load (designed to prevent "crumpling" of the graphic) has a difficult time overcoming it as well, and does not help in solving the friction problem.

A low friction slider bar assembly oriented 90 degrees to the drive motion (i.e., at the top of the graphic image plate) can be employed to support the graphic image plate from a plurality of points. Such a slider bar is commercially available through Igus® inc. of Providence, R.I., as a "DryLin®

N Low Profile Linear Guide System". This slider bar suspends the weight of the graphic and frees the bearing surfaces of the motor drive. The slide itself is specially designed to reduce friction of such motion to a minimum. With a slider bar in place, the spring on the drive mechanism is then able to do its job.

Figure 26:
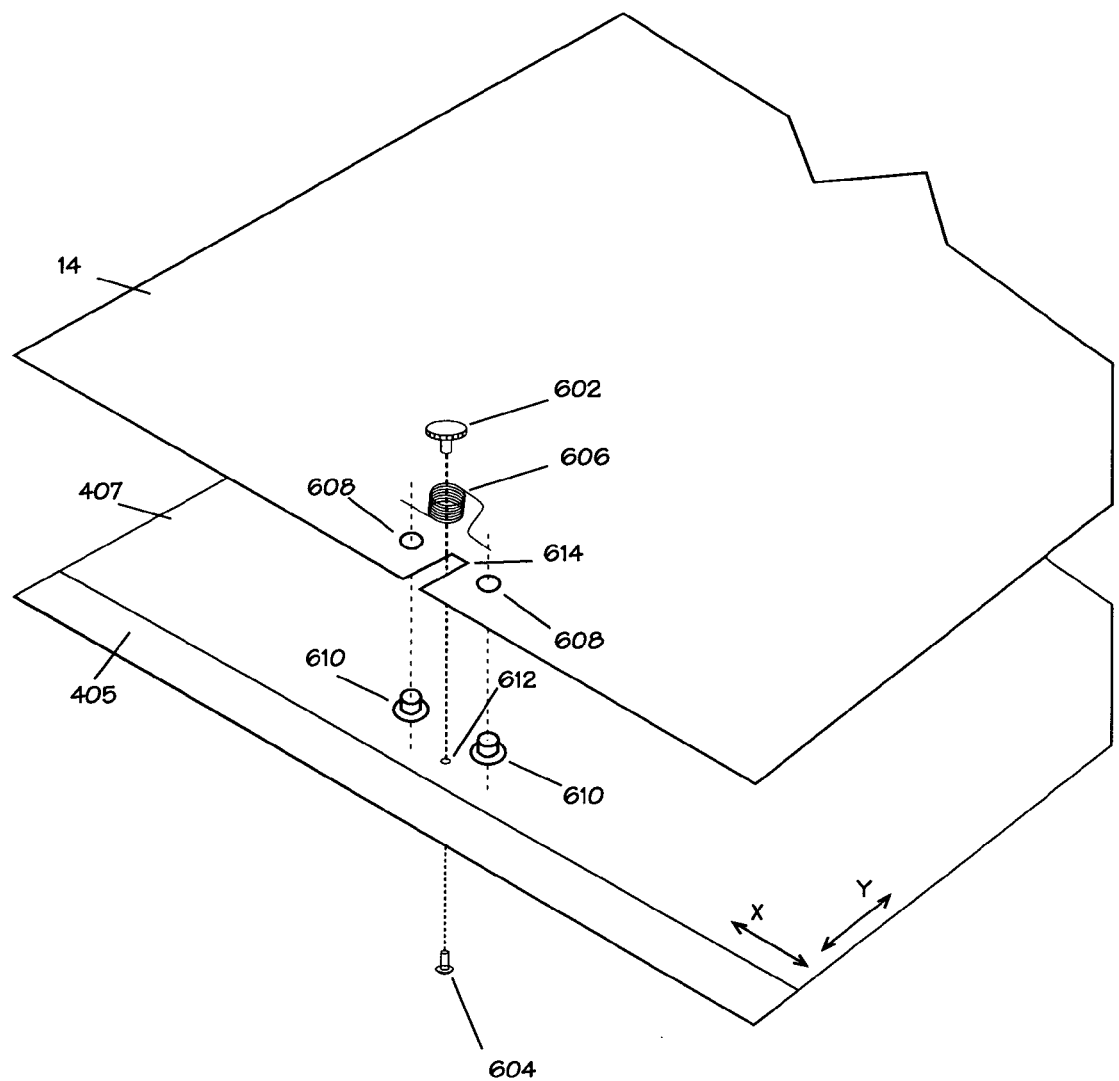
FIG. 26—Illustrates a spring-loaded engagement means disposed distally from the integrally constructed drive motor and adjustment mechanism for providing an appropriate tension throughout the means for storing image information.

FIG. 26 illustrates a spring-loaded engagement means disposed distally from the integrally constructed drive motor and adjustment mechanism for providing an appropriate tension throughout the means for storing image information. Screw 604 is secured through the front of plate 405 in a threaded hole and protrudes out the back. The thumbscrew 602 threads onto it. The graphic 14 has a precision slot 614 punched in it. The size of the slot is matched to the shaft of the thumbscrew 602. This provides a fixed point at the base of the graphic for the x direction while allowing free movement of the graphic in the y direction. To spring-load the assembly, two precision holes 608 are punched in the graphic on either side of the slot 614, and grommets 610, with a very thin lip, are placed in the holes 608. A torsion spring 606 is positioned on the thumbscrew shaft so that the arms of the spring 606 are tensioned against the grommets 610 when the system is at rest. When the drive motor pulls the graphic 14 toward it, the torsion spring 606 exerts a force in the opposite direction. When the drive motor cycle returns the graphic 14, it is done so under tension, as the spring 606 pulls it back. This arrangement smoothes the motion, reducing visual sticking and stutters.

As various possible embodiments may be made in the above invention for use for different purposes and as various changes might be made in the embodiments and methods above set forth, it is understood that all of the above matters here set forth or shown in the accompanying drawings are to be interpreted as illustrative and not in a limiting sense.

I claim:

1. An improved self-actuating display device adapted for insertion into an existing visual display system, the improved device comprising: means for resolving image information; a light-transmissive back plate removably attached to the means for resolving image information; means for storing image information, the means for storing image information positioned between the means for resolving image information and the back plate; means for providing reciprocating motion of the means for storing image information with respect to the means for resolving image information; means for selection of a desired image display sequence from among a plurality of image display sequences; and means for maintaining intimacy of the relationship between the means for resolving image information and the means for storing image information, including a flexible envelope having exterior dimensions approximating the exterior dimensions of the means for storing image information, and a fan disposed proximate an opening in the flexible envelope, the fan providing sufficient static pressure, absent a unique pressure-regulating device, to maintain the envelope in an inflated condition; wherein the envelope exerts sufficient pressure on the means for storing image information to provide intimacy of contact between the means for resolving image information and the means for storing image information.

2. The improved self-actuating display device of claim 1, wherein the means for resolving image information comprises a lenticular lens.

3. The improved self-actuating display device of claim 1, wherein the means for resolving image information comprises a barrier strip.

4. The improved self-actuating display device of claim 1, wherein the means for storing image information comprises a light-transmissive medium including interleaved image information arranged for sequential display of images upon proper alignment with means for resolving image information.

5. The improved self-actuating display device of claim 1, wherein the light-transmissive back plate is removably attached utilizing facing regions of reclosable fastening material secured to facing perimetric regions of the means for resolving image information and the back plate.

6. The improved self-actuating display device of claim 5, wherein the reclosable fastening material comprises hook-and-loop fastener material.

7. The improved self-actuating display device of claim 5, wherein the reclosable fastening material comprises facing regions of hermaphroditic reclosable fastening material.

8. The improved self-actuating display device of claim 1, wherein the back plate includes a light diffusing layer.

9. The improved self-actuating display device of claim 1, wherein the means for providing reciprocating motion of the means for storing image information comprises an integrally constructed drive motor and adjustment mechanism supported proximate one end of the self-actuating display device.

10. The improved self-actuating display device of claim 9, wherein the integrally constructed drive motor and adjustment mechanism includes adjustment means to correct angular alignment errors, if any, between lines of image information on the means for storing image information and corresponding openings in the means for resolving image information.

11. The improved self-actuating display device of claim 9, wherein the integrally constructed drive motor and adjustment mechanism further includes a base plate secured to the means for resolving image information, and a transit plate in sliding contact with the base plate, with the transit plate including a drive pin contacting the means for storing image information.

12. The improved self-actuating display device of claim 11, wherein the integrally constructed drive motor and adjustment mechanism further comprising means for introducing a time delay during reciprocation of the means for storing image information.

13. The improved self-actuating display device of claim 12, wherein the time delay duration is programmable.

14. The improved self-actuating display device of claim 12, wherein the integrally constructed drive motor and adjustment mechanism introduces the time delay proximate the mid-point of travel of the means for storing image information.

15. The improved self-actuating display device of claim 14, wherein the time delay comprises a dwell time during which the means for storing image information does not move with respect to the means for resolving image information.

16. The improved self-actuating display device of claim 11, wherein the means for selection of a desired image display sequence from among a plurality of image display sequences comprises: an eccentric cam mechanism coupled between the base plate and a second movable plate in sliding engagement with the base plate to select an initial position of the means for storing image information with respect to the means for resolving image information; and a locking mechanism to secure the base plate to the second movable plate after the initial position has been selected.

17. The improved self-actuating display device of claim 1, further comprising a spring-loaded engagement means disposed distally from the integrally constructed drive motor and adjustment mechanism for providing an appropriate tension throughout the means for storing image information.

18. The improved self-actuating display device of claim 1, wherein the means for resolving image information comprises a lenticular lens.

19. An improved self-actuating display device adapted for insertion into an existing visual display system, the improved device comprising:
- a barrier strip that resolves image information;
- a light-transmissive back plate removably attached to the barrier strip;
- a light-transmissive medium including interleaved image information arranged for sequential display of images upon proper alignment with the barrier strip, the light-transmissive medium positioned between the barrier strip and the back plate;
- an integrally constructed drive motor and adjustment mechanism supported proximate one end of the self-actuating display device to provide reciprocating motion of the light-transmissive medium and to provide an adjustment capability to correct angular alignment errors, if any, between lines of image information on the light-transmissive medium and corresponding openings in the barrier strip;
- a flexible envelope having exterior dimensions approximating the exterior dimensions of the light-transmissive medium; and
- a fan disposed proximate an opening in the flexible envelope, the fan providing sufficient static pressure, absent a unique pressure-regulating device, to maintain the envelope in an inflated condition;
- such that the envelope exerts sufficient pressure on the light-transmissive medium to provide intimacy of contact between the barrier strip and the light-transmissive medium.

* * * * *